United States Patent [19]
Pataki et al.

[11] Patent Number: 5,396,926
[45] Date of Patent: Mar. 14, 1995

[54] FORCE BALANCED THREE-WAY SOLENOID VALVE

[75] Inventors: Arpad M. Pataki; Bela Doszpoly; Bryan W. Swank; Mark S. Cavanagh; John D. Lane; Kent V. Shields, all of Columbus, Ind.

[73] Assignee: Cummins Engine Company, Inc., Columbus, Ind.

[21] Appl. No.: 263,219

[22] Filed: Jun. 17, 1994

Related U.S. Application Data

[63] Continuation of Ser. No. 34,841, Mar. 19, 1993, abandoned.

[51] Int. Cl.⁶ .............................................. F16K 11/00
[52] U.S. Cl. ........................... 137/596.17; 137/625.65; 251/129.07; 251/129.16; 251/129.18
[58] Field of Search ...................... 137/596.17, 625.65; 251/129.07, 129.16, 129.18

[56] References Cited

U.S. PATENT DOCUMENTS

| | | |
|---|---|---|
| 820,178 | 5/1906 | Buerkle . |
| 1,436,768 | 11/1922 | Mackie et al. ................... 137/625.5 |
| 2,601,989 | 7/1952 | Modes . |
| 3,016,917 | 1/1962 | Hunt . |
| 3,038,499 | 6/1962 | Dumm . |
| 3,151,624 | 10/1964 | Koutnik . |
| 3,680,782 | 8/1972 | Monpetit et al. . |
| 3,800,832 | 4/1974 | Umphenour et al. . |
| 4,176,822 | 12/1979 | Chadwick ................... 137/625.65 X |
| 4,392,612 | 7/1983 | Deckard et al. . |
| 4,561,468 | 12/1985 | Kreitchman et al. . |
| 4,582,294 | 4/1986 | Fargo . |
| 4,598,736 | 7/1986 | Chorkey . |
| 4,932,439 | 6/1990 | McAuliffe, Jr. . |
| 5,005,803 | 4/1991 | Fritz et al. . |
| 5,011,113 | 4/1991 | Stoobs et al. . |
| 5,038,826 | 8/1991 | Kabai et al. . |
| 5,082,180 | 1/1992 | Kubo et al. . |
| 5,114,116 | 5/1992 | Muller et al. . |

FOREIGN PATENT DOCUMENTS 64-69876  3/1989  Japan ........................ 137/596.17

Primary Examiner—Gerald A. Michalsky
Attorney, Agent, or Firm—Sixbey, Friedman, Leedom & Ferguson

[57] ABSTRACT

A pressure balanced three-way solenoid valve including a valve housing having a valve chamber and a high pressure fluid supply passage, high pressure fluid outlet passage and drain passage communicating with the valve chamber is disclosed. A movable valve member is reciprocally received in the valve chamber so as to be reciprocated between first and second positions for selectively fluidically communicating the outlet passage with either the supply passage or drain passage. A first valve seat is formed in the valve housing and concentrically disposed in the valve chamber for fluidic communication between the outlet passage and drain passage and a second valve seat is concentrically disposed in a cavity formed in the movable valve member for sealing communication between the supply passage and outlet passages. A floating pin is received in the movable valve member cavity and communicates with the second valve seat for selectively fluidic communication between the supply passage and outlet passage with the floating pin including an impact absorbing element for absorbing the impact of the movable valve member when the movable valve member contacts the floating pin during de-energization of the solenoid. Transitional losses are readily controlled and a high initial closing velocity may be achieved while preventing closing bounce and thus the formation of any leakage path between the floating pin and movable valve member upon de-energization of the solenoid.

45 Claims, 18 Drawing Sheets

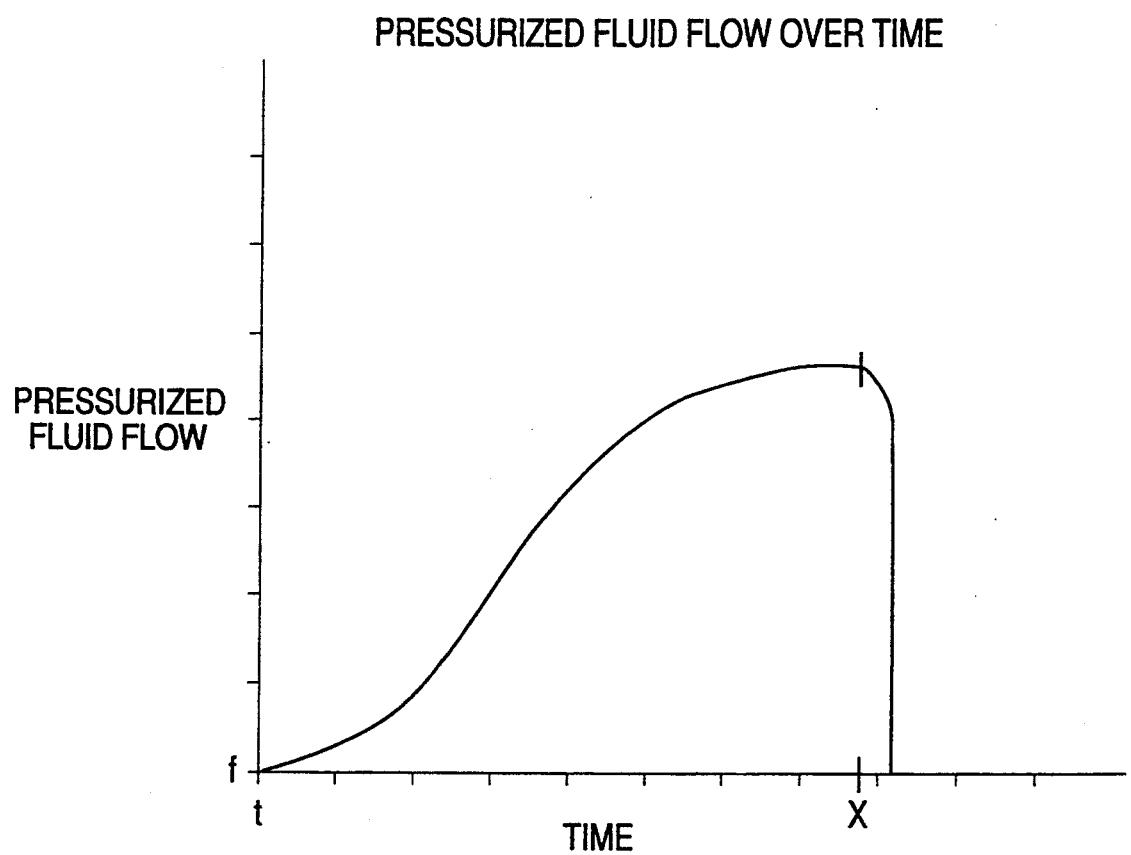

FORCE BALANCED THREE-WAY SOLENOID VALVE

This application is a continuation of Ser. No. 08/034,841, filed Mar. 19, 1993, now abandoned.

BACKGROUND OF THE INVENTION

TECHNICAL FIELD

The present invention is directed to a force balanced, three-way solenoid operated valve and more particularly to a force balanced, three-way solenoid operated valve adapted to handle very high pressures (e.g. above 5,000–30,000 psi) with extremely fast response time (e.g. 200–400 μsec).

BACKGROUND ART

Three-way solenoid valves have long been used for controlling fluid flow in a variety of air and hydraulic systems, particularly fuel systems. Such three-way solenoid valves often control the passage of fluid under high pressure from a source to a load device and selectively interrupt the flow of pressurized fluid while simultaneously connecting the load device to a substantially unpressurized drain. Typically, a three-way valve includes a valve housing having first, second and third valve passages interconnected by an internal valve chamber containing two valve seats and a valve element movable to control fluid flow among the three valve passages by moving between (1) a first position in which the movable valve member engages a first one of the valve seats to isolate a first one of the valve passages from the internal chamber while allowing fluid communication between the second and third valve passages through the second valve seat and internal chamber, and (2) a second position in which the movable valve member engages the second valve seat to isolate a second one of the valve passages while allowing fluid communication between the first and third valve passages through the first valve seat and internal chamber.

With prior art three-way valves, and particularly spring biased, solenoid operated valves, a relatively large magnetic force is usually required when the valve is used to control high pressure fluids to overcome the spring pressure which is necessary for maintaining the valve in an initial position prior to energization of the solenoid valve. To provide an adequate magnetic force, a relatively large, heavy and costly solenoid is often required.

As is disclosed in U.S. Pat. No. 2,601,989 issued to Modes, three way valve operation can be improved if the movable valve member is substantially force balanced. In particular, this reference discloses a three-way valve which includes two inlets supplying fluid from respective sources and a single outlet passage where the three-way valve can be positioned to permit the passage of fluid selectively from one of the two fluid sources to the outlet passage. With the three-way valve of Modes, there is no return spring for returning the valve to an initial position which must be overcome by an operator such as a solenoid. In order to achieve the force balanced characteristics of the modes valve, the valve seats must be of an equal diameter. Since the disclosed valve is a manually operated valve, a quick response time is not necessary. Thus, the force balance characteristic merely aids a manual operator in moving the movable valve member between first and second positions.

A similar valve construction is illustrated in U.S. Pat. No. 3,038,499 issued to Dumm which discloses a three way valve including a movable valve member (head 11) manually movable between first and second positions. Dumm's three-way valve also includes valve seats (6,7) which are of equal diameters. In order to balance the pressures acting on the movable valve member, a force balancing cylinder 8 is provided with a piston 12 connected with the movable valve member (head 11) by means of a rod 13. A first valve passage is provided in the rod such that identical fluid pressures act against both the bottom of the head and the top of the piston, while a second valve passage is provided such that identical fluid pressures act on the top of the head and bottom of the piston. As with the previously noted three-way valve, there is no spring force which must be overcome when moving the movable valve member between first and second positions and, moreover, each of the aforementioned valves are not quick response valves but merely manual valves which control the flow of fluid among three valve passages by movement of a force balanced valve element between two valve seats.

U.S. Pat. No. 4,582,294 issued to Fargo discloses a three-way solenoid valve for selectively directing fluid flow between a fluid supply passage and first and second fluid outlet passages. When the solenoid is energized, a movable valve member is drawn upwardly against the force of a compression spring and seals against a stationary member thus permitting the flow of pressurized fluid from a source of pressurized fluid to a load device, in this case a hydraulic cylinder. When de-energized, the force of the compression spring moves the movable valve member into contact with a valve seat thus stopping the flow of pressurized fluid to the load device and exhausting that pressurized fluid previously supplied thereto. However, when energized, the effective surface area subjected to high pressure fluid is greater in an upward direction, thus requiring the use of a compression spring having a strength capable of overcoming the difference in fluid pressure acting on the movable valve member. Consequently, this arrangement necessitates the use of a larger solenoid in order to overcome the required stronger compression spring force acting in the downward or closing direction. Accordingly, such a three-way solenoid valve construction is not truly force balanced in both the energized and the de-energized states. Fargo further relies upon a flexible diaphragm in the valve chamber which would make the Fargo unsuitable for high pressure applications.

Further, the three-way solenoid valve discussed hereinabove may suffer from transition losses during the movement of the movable valve member between the de-energized and energized state. That is, during movement of the movable valve member, pressurized fluid supplied through one of the valve passages is open to both the cylinder flow path and the exhaust flow path whereby some pressurized fluid is wastefully allowed to flow directly into a valve passage which serves as a low pressure drain until the movable valve member shuts off the supply of pressurized fluid. Additionally, although sealing rings of a resilient material are provided at the valve seats in order to cushion the impact of the movable valve member, such sealing tings will wear over time requiring replacement.

In an effort to overcome the aforementioned shortcomings, U.S. Pat. No. 4,598,736 issued to Chorkey provides a solenoid operated three-way valve which is described as being force balanced in both the energized and de-energized states. In order for such pressure balancing to be accomplished in a valve of the type disclosed in Chorkey, the valve seats in both the energized and de-energized states must have of the same effective seal area. In the de-energized state, a counter-balancing spool member is provided such that pressures acting on the movable valve member from the pressurized fluid source are acting against equal effective surface areas in both the upward and downward directions, thus maintaining the valve in a pressure balanced condition while in the de-energized state. When energized, the movable valve member is drawn upwardly against a second fixed valve seat, having an effective seal area equal to that of the first valve seat. In doing so, the movable valve member is pressure balanced in that the fluid pressure forces acting on the movable valve member in both the upward and downward direction are equalized. Accordingly, the solenoid need only overcome the force of the compression spring when energized and when de-energized, the compression spring need not act against fluid pressure in order to reseat the movable valve member against the first valve seat. Thus, a compression spring of a reduced force can be used which results in the ability to employ an electromagnetic element of reduced capacity. Moreover, as mentioned above, in order for the movable valve member to be force balanced in both the energized and de-energized states, it is imperative that the diameter of both the first and second valve seats be equal which in turn may not provide for optimal fluid flow characteristics during the operation of the solenoid operated valve.

As with the Fargo three-way solenoid valve, the Chorkey solenoid valve suffers from transition losses due to the high pressure fluid source being opened to both the load device passage and drain passage simultaneously as well as from possible damage to the resilient sealing rings. While an impact absorbing spring (spring 55) may be provided for absorbing some of the impact when the solenoid is energized, the valve seats are fixed members which can not readily absorb any of the impact which may result in a phenomenon known as "valve closing bounce" which momentarily opens a leakage path between the valve seat and movable valve member when attempting to achieve high closing velocities and thus a quick response time. That is, when the movable valve member initially closes, it will rebound and "bounce" away from the valve seat resulting in a momentary and undesirable flow of pressurized fluid through the space created during the "bounce". Moreover, valve seals 54 and 64 are said to be formed of elastomeric materials which would make the Fargo valve unsuitable for high pressure application.

U.S. Pat. No. 5,038,826 issued to Kabai et at. discloses a high speed solenoid operated three-way valve which is designed to handle extremely high fluid pressures with minimal fluid leakage. The Kabai et al valve includes a reciprocating hollow movable valve member having a floating inner pin telescopingly received within the hollow movable valve member. In an advanced position, the hollow movable valve member is spring biased into engagement with a first valve seat formed in the surrounding valve housing and engaged by an outer end of the movable valve member. In a solenoid retracted position, the movable valve member is biased against the floating inner pin to open the first valve seat and close a second valve seat located within the hollow movable valve member and positioned to be engaged by one end of the floating inner pin. To obtain fluid force balance on the movable valve member of the Kabai et al three-way valve, the effective diameters of the first and second valve seats must be made equal. As shown in an earlier version of this type of "pin within a sleeve" three way valve, illustrated in U.S. Pat. No. 3,680,782 to Monpetit et at, the size of the valve seats may be made slightly different in order to create a fluid bias tending to bias the floating inner pin against the physical stop. While the "pin-within-a-sleeve" design provides very fast response time and the ability to handle very high pressures, certain problems remain unsolved with this type of three-way valve.

For example, the respective effective sizes of the valve seats must be exactly equal to insure that the hollow sleeve movable valve member is perfectly fluid force balanced or only slightly different in size to provide a bias on the floating pin as taught by Monpetit et at. Moreover, the Kabai et al design provides no mechanism for easily adjusting the axial position of the floating pin which is crucial to controlling the distance through which the hollow sleeve must move from fully opened to fully closed positions. This distance must be large enough to provide adequate flow characteristics but should not be larger than necessary to minimize the valve response time and minimize the wasteful loss of pressurized fluid while the hollow movable valve member is moving between its fully advanced and fully retracted positions.

Loss of high pressure fluid can be especially troublesome in internal combustion engine fuel supply systems employing a three-way valve of the type disclosed in Kabai et at. Extremely high fuel pressures (above 5,000 to acceptable levels of efficiency and governmentally mandated levels of pollution control. Any leakage of high pressure fuel within the fuel system represents wasted energy that can reduce internal combustion engine efficiency. Kabai et al attempt to deal with the problems of leakage by reducing the leakage of pressurized fluid between the hollow movable valve member and the surrounding valve housing by providing a clearance reducing feature in the high pressure chamber area of the hollow movable valve member. This approach gives rise to the possibility of wall scuffing and possibly valve sticking and ignores losses created when pressurized fluid is permitted to flow from the pressurized passage to the discharge or drain passage during the time that the hollow movable valve member is moving between its fully advanced and fully retracted positions. This phenomena occurs when the control valve is operated to move the movable valve member against a valve seat to shut off high pressure fuel flow to the fuel injector. If the movable valve member approaches the valve seat at a large velocity, as is necessary for obtaining a fast acting valve having adequate flow capacity, the movable valve member will impact the valve seat with considerable force and may bounce back thereby causing uneven, unpredictable, and untimely fuel flow into the engine cylinder as well as unproductive loss of pressurized fuel.

Both the Kabai et al and Monpetit et al patents disclose "pin-within-a-sleeve" type three-way valves wherein the floating inner pin is located on the same side of the valve as the solenoid. This arrangement can lead to difficulties in properly positioning and adjusting the axial portion of the floating inner pin.

Because a fuel injection control valve must operate over many cycles per minutes during engine operation, very substantial high pressure fuel losses can occur in a three-way valve of the type disclosed in Kabai et at. Kabai et al also fail to deal with the problems of leakage associated with "valve closing bounce."

SUMMARY OF THE INVENTION

The purpose of the subject invention is to overcome the shortcomings of the prior art as discussed above and to improve on the operating characteristics achievable through implementation of the prior art teachings. It has been determined that at times it may be desirable to provide differing flow characteristics for each of the two valve seats of a force balanced three-way valve. For example, it would be desirable for different flow characteristics to apply to the pressurized fluid from the supply source to the load and subsequently between the load and the drain in order to obtain a slower initial start-up of the load device while achieving a quick stop of flow to the load device. Since the effective valve seat diameters directly impact the flow handling capability of a valve upon initial opening and closing, the above-mentioned valves do not readily lend themselves to the provision of different effective flow handling capability while maintaining the aforementioned force balanced characteristics in that any substantial variations in the valve seat diameters would destroy the force balanced nature of the valve.

Accordingly, there is a need in the art for a pressure balanced three-way electromagnetic solenoid valve exhibiting a quick response time under high pressure conditions wherein the valve assembly includes valve seats of varying diameter. By this arrangement significantly different opening and closing flow characteristics may be designed into a three way valve without sacrificing the benefits of fluid force balancing the movable valve member. Moreover, there is a need for a quick response three-way solenoid valve wherein any transition losses are minimized and the closing impact is cushioned so as to significantly limit or eliminate any leakage paths due to "valve closing bounce".

A primary object of the present invention is to overcome the aforementioned shortcomings associated with known prior art three-way solenoid operated valves.

A further object of the present invention is to provide a force balanced solenoid operated three-way valve exhibiting quick response time (e.g., 200–400 $\mu$see) which allows for the control of initial high pressure fluid flow and a quick termination of the high pressure flow to a load device.

Another object of the present invention is to provide a pressure balanced three-way solenoid valve wherein the valve stroke of the valve may be readily adjusted to achieve desired flow characteristics.

A further object of the present invention is to provide a pressure balanced three-way solenoid valve which significantly limits transitional losses due to the interconnection of the high pressure fluid supply passage to both a load device connected passage and drain connected passage during movement of the valve element between its fully advanced and fully retracted positions.

A further object of the present invention is to provide a pressure balanced three-way solenoid valve whereby a solenoid of reduced strength, weight and size may be used to operate the valve.

Yet another object of the present invention is to provide a system for cushioning the impact of a movable valve member when the high pressure fluid supply passage is closed.

An additional object of the present invention is to reduce the phenomenon known as "valve closing bounce" thereby eliminating any high pressure fluid leakage and erratic shut off which heretofore may have been resulted.

Still another object of this invention is to provide a "pin-within-a-sleeve" type three-way valve having one or more of the above characteristics.

Yet another object of the invention is to provide a "pin-within-a-sleeve" type of three-way valve providing one or more of the above objects to create a valve assembly which is ideally suited to control fluid injection into the cylinder of an internal combustion engine while minimizing the leakage of high pressure fuel which would lead to reduced engine efficiency.

Still another object of this invention is to provide a three-way valve providing one or more of the above objects in a valve assembly which can be manufactured to extremely precise tolerances to minimize fluid leakage and achieve high valve sealing integrity while minimizing the number of surfaces which must be machined to close tolerances.

Yet another object is to provide a three-way, force balanced solenoid valve having different opening and closing high pressure fuel flow characteristics in a "pin-within-a-sleeve" type of assembly wherein the floating pin is arranged to engage a retraction stop at one end of the hollow sleeve and the solenoid for operating the valve is located at the opposite end of the sleeve.

These as well as additional objects of the present invention are achieved by providing a pressure balanced three-way solenoid valve including a valve housing having a valve chamber and a supply passage adapted to be externally connected to a high pressure fluid supply, an outlet passage adapted to be connected to an external device such as a fuel injector nozzle and a drain passage adapted to be connected with a low pressure drain wherein the valve passages are all fluidically connected to the valve chamber. A movable valve member is reciprocally received in the valve chamber for movement between first and second positions for fluidically communicating selectively the outlet passage with either the supply passage or drain passage. A first valve seat is formed in the valve housing and concentrically disposed in the valve chamber for blocking fluidic communication between the outlet passage and drain passage and a second valve seat is concentrically disposed in a cavity in the movable valve member for blocking fluidic communication between the supply passage and outlet passage with the first valve seat and second valve seat having substantially unequal effective sealing areas. A floating pin is received in the movable valve member cavity and cooperates with the second valve seat for selectively isolating the supply passage and the outlet passage with the floating pin including an impact absorbing element for absorbing the impact of the movable valve member when the movable valve member contacts the floating pin during de-energization of the solenoid. In doing so, transitional losses may be readily controlled and a high initial closing velocity may be achieved in that the impact absorbing element aids in preventing "valve closing bounce" and thus the formation of any leakage path between the floating pin and movable valve member after contact is made between the floating pin and movable valve member at the second valve seat.

Further, transitional losses are prevented by permitting the floating pin to follow the movable valve member through much of its valve stroke in order to maintain the flow path between the supply passage and outlet passage closed until the flow path between the outlet passage and drain passage is open only a minimal amount. The floating pin being stopped just prior to closing of the flow passage between the outlet passage and drain passage with the floating pin then being forced away from the movable valve member by the high pressure fluid passing there between to provide a fully open condition.

Further objects of the present invention are achieved by providing a pressure balanced three-way solenoid valve including a valve housing having a valve chamber and a high pressure fluid supply passage, high pressure fluid outlet passage and drain passage fluidically communicating with the valve chamber. A movable valve member is reciprocally received within the valve chamber for selectively connecting the outlet passage with one of either the supply passage or drain passage. A first valve seat is concentrically disposed in the valve chamber of the housing for cooperation with the movable valve member isolating the outlet passage from the drain passage and a second valve seat is concentrically disposed in a cavity opening into one end of the movable valve member for receiving a floating pin for isolating the supply passage from the outlet passage. The floating pin includes a sealing surface at a first end thereof and a movement limiting means positioned adjacent a second end thereof which is remote from the first end, with the movement limiting means including a stop in the form of a pin extending transverse to the direction of movement of the movable valve member. The pin being of a generally square cross section and having an intermediate portion thereof being recessed to various depths about the periphery of the pin such that rotation of the pin changes the positioning of the floating pin and thus the length of the valve stroke.

The foregoing as well as additional advantages of the present invention will become apparent from the following detailed description when read in light of the several figures.

BRIEF DESCRIPTION OF THE DRAWINGS

FIG. 6 is a graphic illustration of the slow controlled start up and sharp ending of pressurized fluid flow over time by way of the three-way solenoid valve illustrated in FIGS. 1-3;

DETAILED DESCRIPTION OF THE INVENTION

The present invention will now be described in greater detail in connection with FIGS. 1 through 12.

Figure 1:
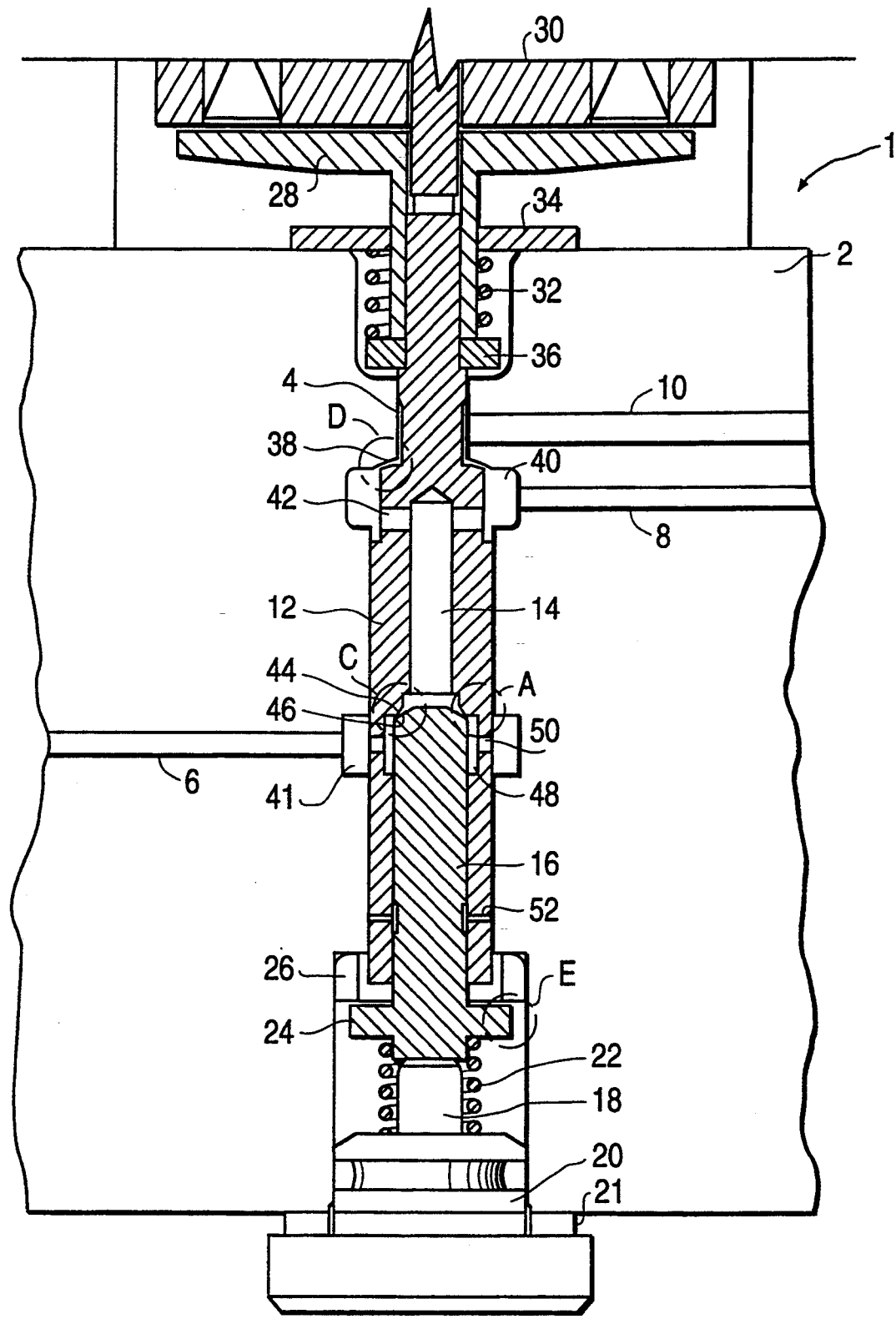
FIG. 1 is a cross-sectional view of a force balanced three-way solenoid valve in accordance with a preferred embodiment of the present invention in the closed and de-energized state.
Figure 2:
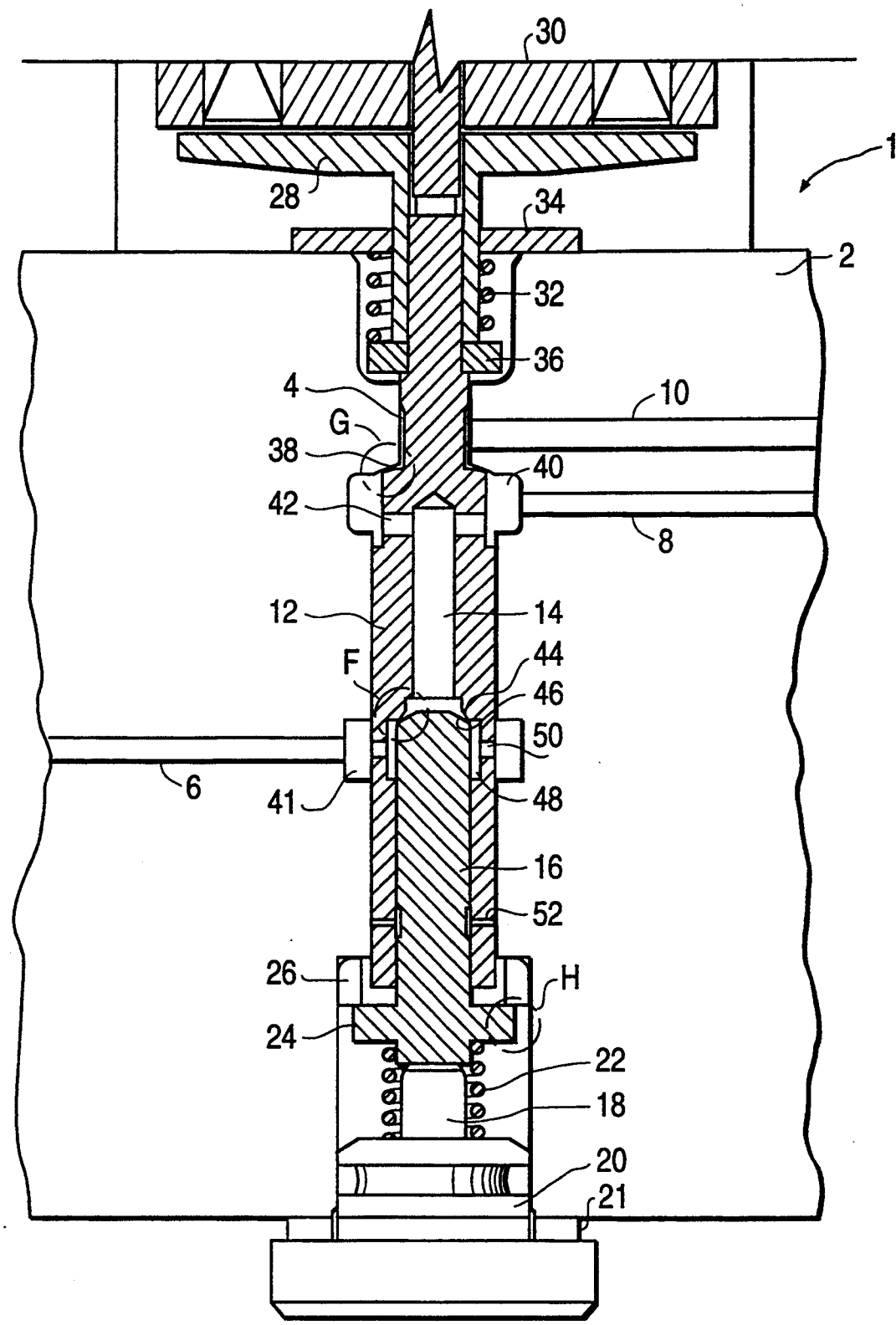
FIG. 2 is a cross-sectional view of the force balanced three-way solenoid valve in accordance with the preferred embodiment of the present invention during movement of the movable valve member between a fully closed position and fully opened position.
Figure 3:
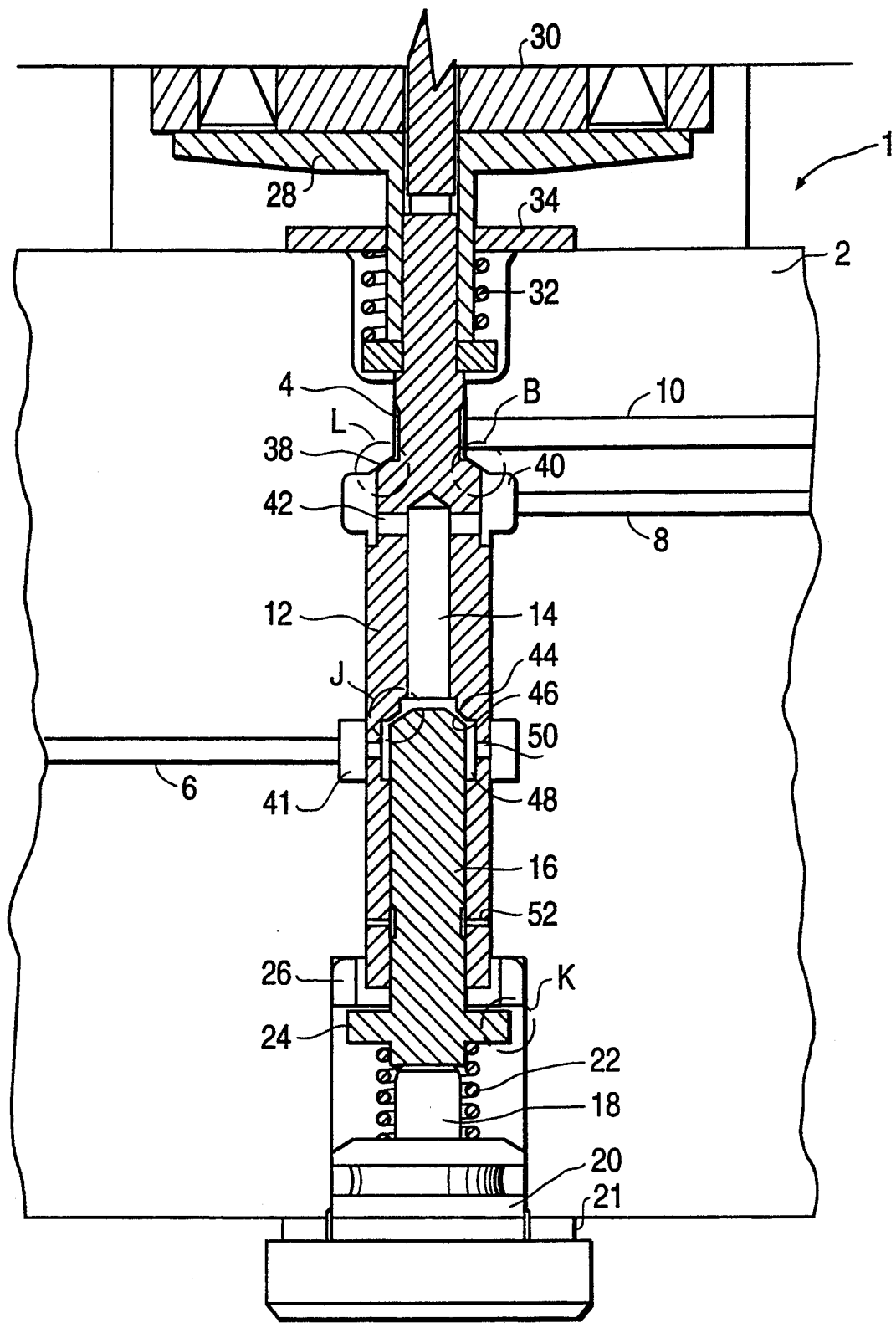
FIG. 3 is a cross-sectional view of the force balanced three-way solenoid valve in accordance with the preferred embodiment of the present invention in the fully opened and energized state.

Referring initially to FIGS. 1 through 6 and particularly FIGS. 1 through 3, the force balanced or pressure balanced three-way solenoid valve assembly in accordance with a preferred embodiment of the present invention is illustrated. This valve design is particularly suited for application as an injection control valve used in a compression ignition internal combustion engine wherein desirable fuel injection pressures in excess of 20,000 psi may be required. The pressure balanced three-way solenoid valve 1 includes a valve housing 2 which includes a valve chamber 4 in the form of a central bore extending the entire length of the housing as well as fluid communication valve passages 6, 8 and 10, fluidically communicating with the valve chamber 4. Valve passage 6 is a high pressure fluid supply passage and may be connected with a source of high pressure fuel for an internal combustion engine. For example, valve passage 6 may be connected to an accumulator (not illustrated) which is adapted to temporarily retain fuel at very high pressure, for example, in excess of 5,000 to 30,000 psi. Such pressures are highly desirable in order to achieve high engine efficiency and low emissions. Controlling fluids under such high pressure is difficult in any circumstances but is particularly difficult in the case of fuel injection systems since the timing and quantity of fuel must be very precisely controlled in synchronism with engine operation. The present invention provides a three way valve which is ideally suited to control the supply of fuel to the individual cylinders of an internal combustion engine but may be used in any environment or for any purpose requiring fluid control under conditions of high pressure, high speed and precise control.

Valve passage 8 may be connected to supply pressurized fluid to a load device such as a hydraulic cylinder, fuel injection nozzle or the like. As will be explained in greater detail below, valve passage 10 is a drain passage for returning fluid to a fluid supply (not shown).

Reciprocally positioned within the valve chamber 4 is a movable valve member 12 which is adapted to reciprocate between first and second positions to control fluid communication among valve passages 6, 8 and 10. Movable valve member 12 is sized to form a close sliding fit with the inside surface of valve chamber 4 creating a fluid seal between the adjacent surfaces to prevent fluid from leaking from the valve assembly. Movable valve member 12 contains a cavity 14 formed to open into one end of valve member 12. Received in cavity 14 of the movable valve member 12 is a free or floating pin 16 sized to form a close sliding fit with the inside surface of valve member cavity 14 creating a fluid seal which substantially prevents fluid from leaking from the clearance between the pin 16 and movable valve member 12.

The significance of the positioning of the floating pin 16 in a lower portion of the movable valve member 12 will be explained in greater detail hereinbelow. A retraction stop 18 which is formed as an extension of a plug or other suitable fixing member 20 provides a lower limit for the movement of the floating pin 16 within cavity 14 of movable valve member 12. A compression spring 22 is positioned about the retraction stop 18 and in contact with a radial flange 24 of the floating pin 16 in order to bias the floating pin 16 in a direction away from the retraction stop 18. In accordance with the present invention, the lower limit of movement of the floating pin 16 may be readily adjusted by varying the height of retraction stop 18 or the amount in which the plug 20 is inserted into the valve chamber 4 as determined by a spacer or washer-like shim 21. Further, the distance in which the floating pin 16 may be advanced by the spring 22 is controlled by a shim 26. The significance of shim 26 will be described in greater detail hereinbelow with respect to the operation of the three-way solenoid valve 1.

An upper portion of the movable valve member 12 is secured to an armature 28 which is positioned adjacent to an electromagnetic solenoid 30 which in the embodiment of FIG. 1 is arranged to pull upwardly on the armature 28 illustrated in the drawing. A compression spring 32 is provided for biasing the movable valve member 12 in a direction away from the solenoid 30. In accordance with a preferred embodiment of the present invention, the compression spring 32 is of a greater strength than that of spring 22. For example, the compression spring 32 may be a 100 pound spring while the spring 22 would be on the order of approximately 80 pounds. As can be seen from FIG. 1, a fixed plate 34 is positioned concentrically about the movable valve member 12 and contacts the compression spring 32 while the washer 36 is secured about the movable valve member 12 and is contacted by the second end of the compression spring. Accordingly, the downward force of the compression spring 32 is readily transferred to the movable valve member 12 by way of the washer 36.

Figure 6A:
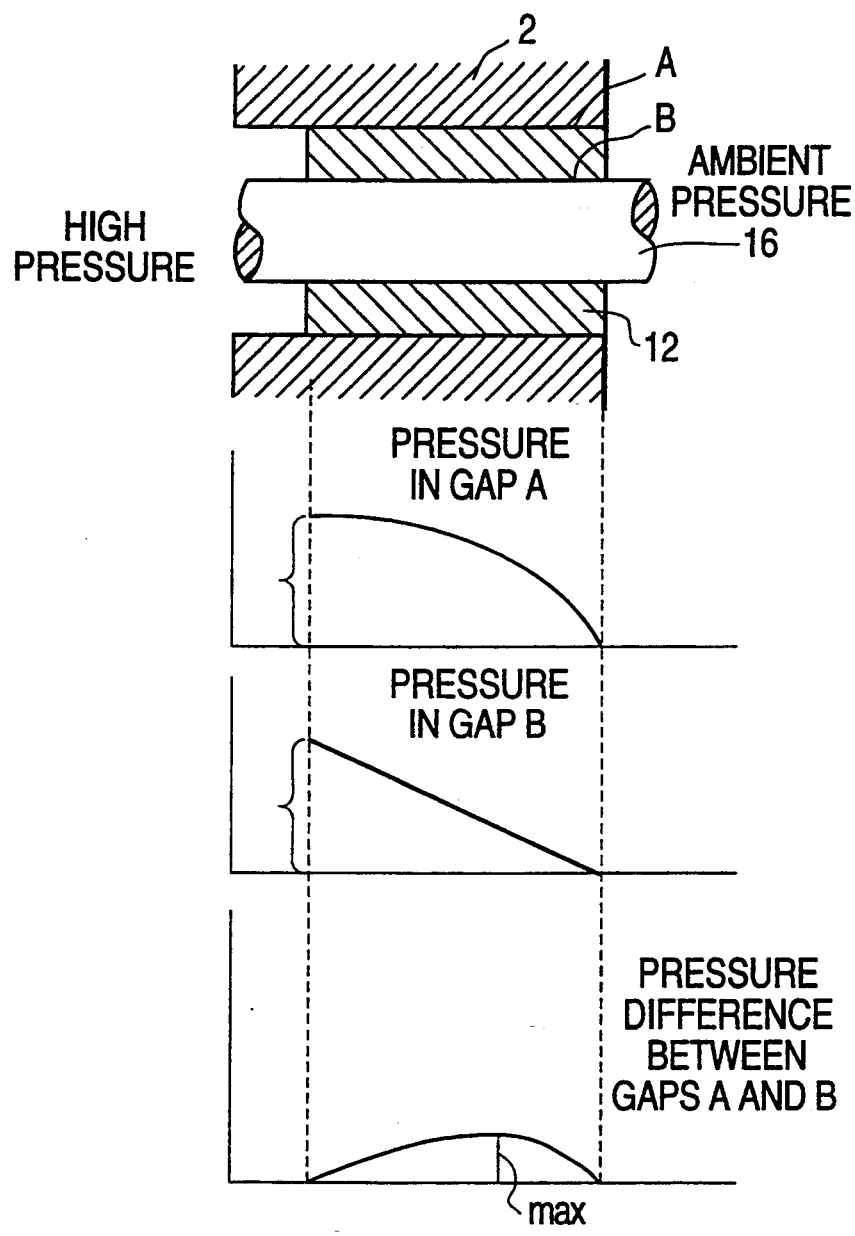
FIGS. 6a-6c are graphic illustrations of the fluid pressure profiles within critical leak prone gaps formed in the valve assembly of the present invention.
Figure 6B:
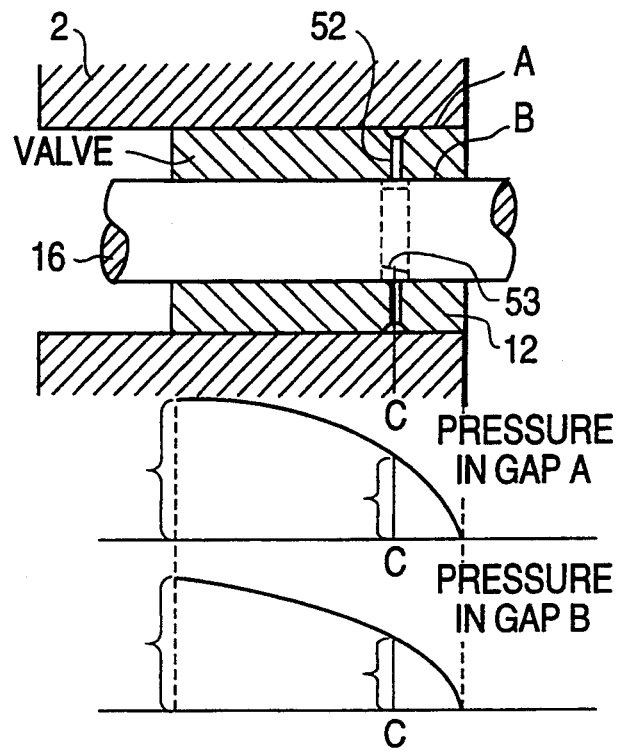
Figure 6C:
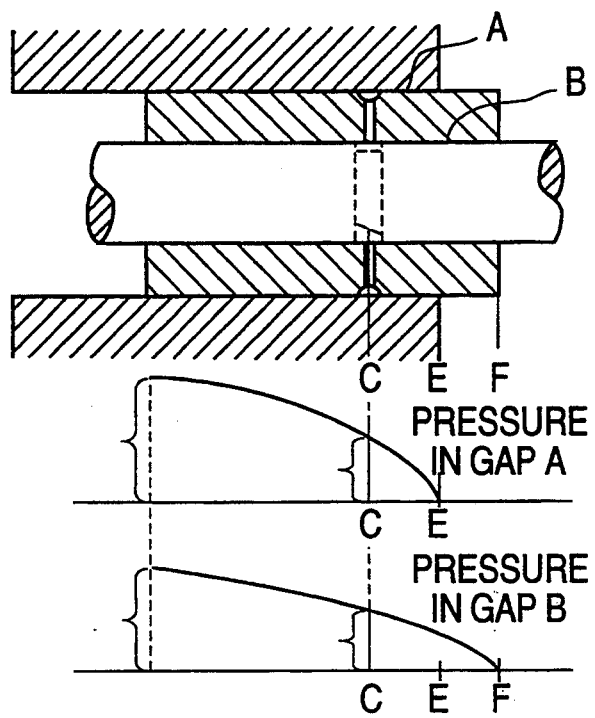

Forming a portion of the housing between the outlet valve passage 8 and drain valve passage 10 is a valve seat 38 which when in contact with the movable valve member 12 forms a seal between first outer annular recess 40 and drain passage 10 to isolate drain passage 10 from the remaining valve passages 6 and 8. As will be explained in greater detail, valve passages 6 and 8 are fluidically connected when the movable valve member 12 is positioned as illustrated in FIG. 1. Valve housing 2 contains a first outer annular recess 40 communicating with valve chamber 4. Outer annular recess 40 is axially positioned adjacent valve seat 38. Housing 2 also contains a second outer annular recess 41 in fluid communication with supply passage 6. Further, a first radial passage 42 is formed in the movable valve member in order to fluidically connect the first outer annular recess 40 with the movable valve member cavity 14 of the movable valve member 12. Additionally, formed in cavity 14 of the movable valve member 12 is a valve seat 44 which cooperates with an upper surface 46 of the floating pin 16 in order to seal fluidic communication between an inner annular recess 48 formed in the movable valve member 12 and the first outer annular recess 40 and consequently the outlet passage 8. Pressurized fluid from the high pressure fluid supply passage 6 is received in the inner annular recess 48 by way of second radial passage 50. Movable valve member has a sufficiently close sliding fit with the inside surface of the valve chamber 4 to form a fluid seal along substantially the entire length of the movable valve member 12 extending between the first and second outer annular recesses 40 and 41. The seal forming close fit extends beyond the second outer annular recess 41 to seal recess 41 against fluid leakage between the valve housing 2 and the movable valve members. A further passage 52 is provided in movable valve member to equalize the pressure on both sides of the hollow portion of movable valve member 12. In particular, studies have shown that the fluid pressure at any point along the axial length of a small gap between two mating surfaces would have a generally declining amplitude when the small gap is subjected to high pressure at one end and low pressure at the other end. FIG. 6a depicts gap A between the valve housing 2 and movable valve member 12 and gap B between floating pin 16 and movable valve member 12. The pressure profiles within gaps A and B are not identical because fluid pressure induces different degrees of distortion of the respective gaps A and B. By placing a radially oriented pressure equalizing passage 52 in the hollow portion of the movable valve member and providing an annular recess 53 as illustrated in FIG. 6b, the amount of fuel which leaks through gaps A and B can be reduced. This phenomena can be understood by considering the following:

When the F end of the movable valve member 12 protrudes from the valve housing, and the floating pin 16 protrudes from the end of the valve, FIG. 6c, the result in final gap (A) between the housing 2 and the movable valve member 12 is that the internal pressure in the valve at section E increases the diameter of the valve, i.e., the gap (A) between the housing end of the movable valve member 12 will be smaller, i.e., the leakage flow through gap (A) will be decreased. There will be some increase in flow around the floating pin (gap B), but because of the smaller diameter the total leakage flow through gaps A and B will be reduced.

Figure 1A:
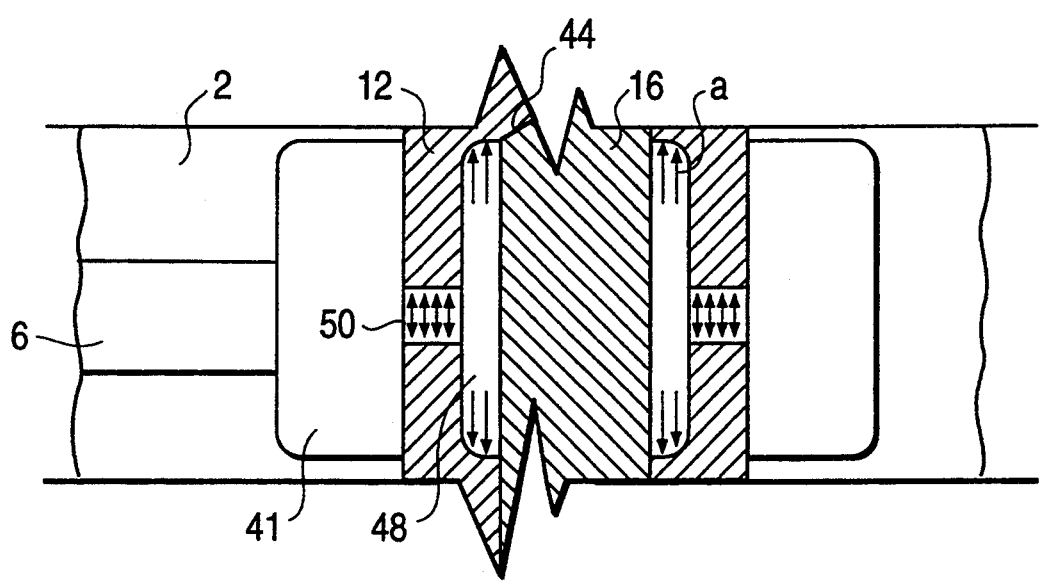
FIG. 1A is an expanded cross-sectional view of the portion of the three-way solenoid valve at FIG. 1 about the lower valve seat.
Figure 1B:
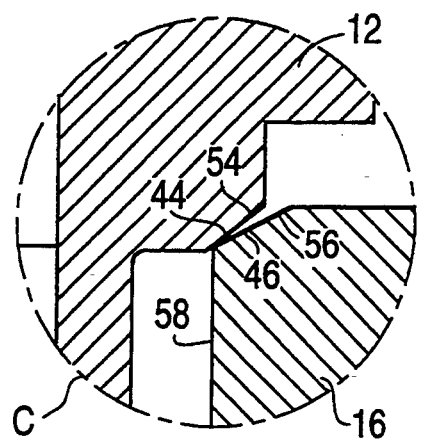
FIG. 1B is an expanded view of the area C of FIG. 1.

The three-way solenoid valve 1 of FIG. 1 is illustrated in a de-energized state wherein the movable valve member 12 is biased by spring 32 into engagement with floating pin 16 to cause upper surface 46 to be biased into engagement with valve seat 44 as illustrated by exploded section C of FIG. 1B. In this position, it can be seen that the valve assembly is readily pressure balanced in that the effective surface area of the movable valve member 12 which is subjected to high pressure fluid from the high pressure fluid supply passage 6 in both the upward and downward directions are equal. This feature being best illustrated in FIG. 1A which is an expanded view of the area surrounding the inner annular recess 48. As is illustrated in FIG. 1A, the pressurized fluid which fills the inner annular recess 48 and second radial passage 50 when the floating pin 16 is seated in valve seat 44, acts on an identical surface area in both the upward and downward directions as illustrated by arrows a. Movable valve member 12 is not otherwise subjected to significant fluid pressure when located in the position illustrated in FIG. 1 because the fluid pressure in drain passage 10 is at zero, or at least a comparatively low pressure (i.e., less than 10 psi), as compared with the very high pressure of supply passage 6 (i.e., 20,000 psi or greater). Accordingly, the net force acting on the movable valve member 12 by the high pressure fluid retained in the second radial passage 50 and inner annular recess 48 is zero, thus resulting in a pressure balanced or force balanced valve in the de-energized state.

Figure 4:
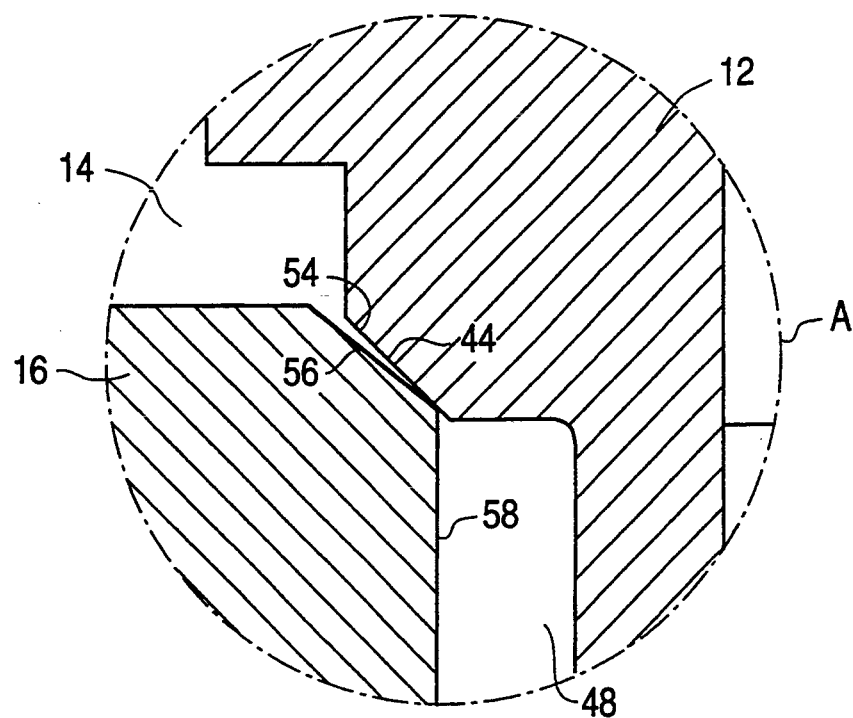
FIG. 4 is an expanded view of the area of A of FIG. 1.
Figure 5:
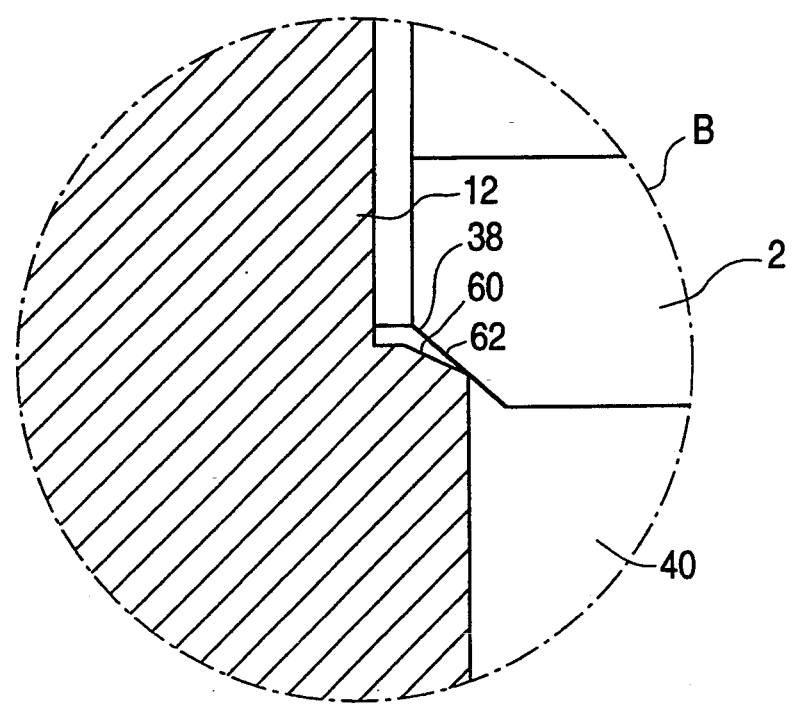
FIG. 5 is an expanded view of the area B of FIG. 3.

As can be seen from FIG. 4, the valve seat 44 in the movable valve member 12 includes a frusto-conical surface 54. This surface is concentric about the central axis of movable valve member cavity 14. Moreover, the upper surface 46 of the floating pin 16 includes a frusto-conical portion 56 with the angle of inclination with respect to the central axis of cavity 14 of the frusto-conical portion 56 of the floating pin 16 being less than that of the angle of inclination of the frusto-conical surface 54. In doing so, a circular line of contact is formed between the outer edge of frusto-conical portion 56 of the floating pin 16 and the frusto-conical portion 56 to readily form a seal therebetween. Providing such contact between the floating pin 16 and the movable valve member 12 at the valve seat 44 results in a significant reduction in the requisite machining tolerances as compared to that of valve seats which require the frusto-conical surface 54 and frusto-conical portion 56 to be of identical inclinations. Moreover, the almost fine-of-contact seal between the floating pin 16 and movable valve member 12 aids in the separation of the floating pin 16 and movable valve member 12 during operation of the valve 1.

Referring now to each of FIGS. 1-1D, 2-2C and 3-3D, the operation of the force or pressure balanced three-way solenoid valve 1 will be set forth hereinbelow in greater detail.

Figure 1C:
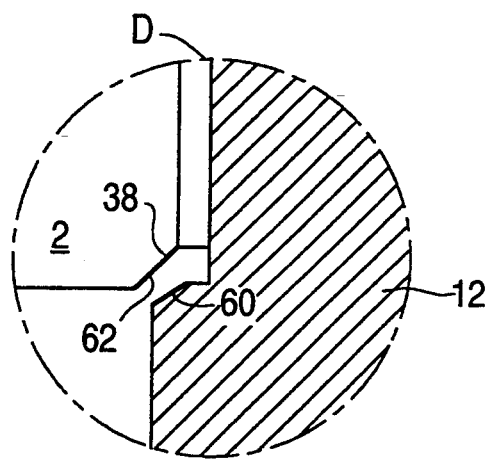
FIG. 1C is an expanded view of the area D of FIG. 1.
Figure 1D:
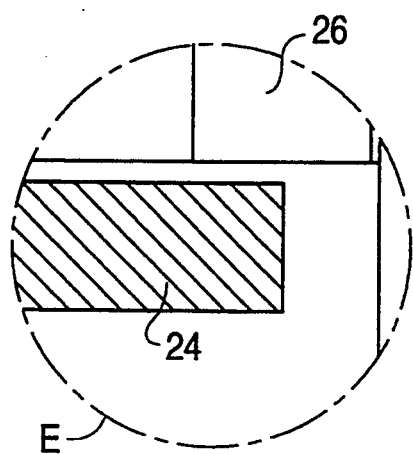
FIG. 1D is an expanded view of the area E of FIG. 1.

As discussed previously and illustrated in FIG. 1, in the de-energized state, the armature 28 is spaced a predetermined distance away from the solenoid 30, the floating pin 16 is positioned against the retraction stop 18 and the upper surface 46 of floating pin 16 is seated in the valve seat 44 (see FIG. 1B), thus sealing fluid communication between the high pressure fluid supply passage 6 and outlet passage 8. Further, the movable valve member is spaced away from the valve seat 38 (see FIG. 1C), thus permitting fluidic communication between the first outer annular recess 40 and drain passage 10. Further, the radial flange 24 is spaced a predetermined distance from the shim 26 (see FIG. 1D).

Figure 2A:
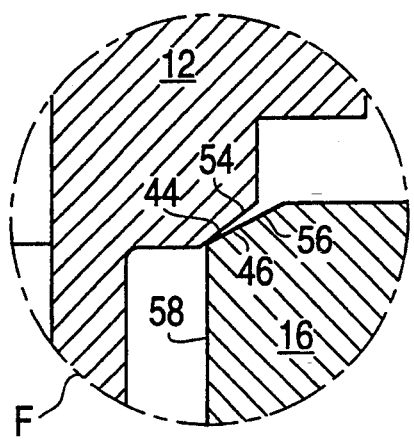
FIG. 2A is an expanded view of the area F of FIG. 2.
Figure 2B:
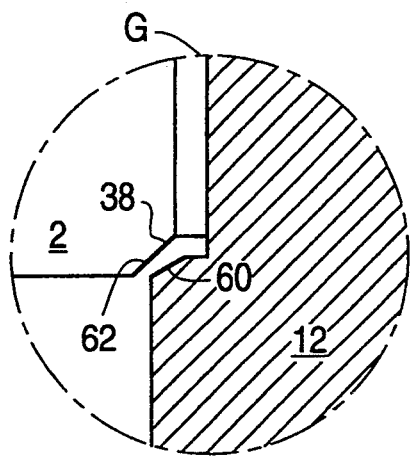
FIG. 2B is an expanded view of the area G of FIG. 2.
Figure 2C:
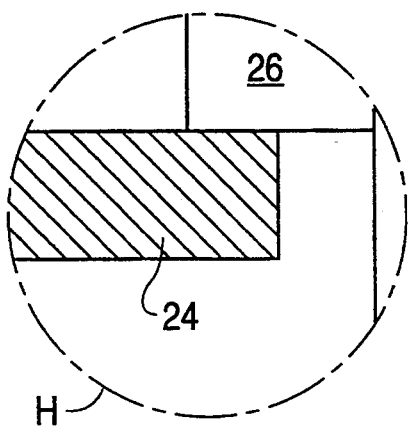
FIG. 2C is an expanded view of the area H of FIG. 2.

Referring now to FIG. 2, when solenoid 30 is energized, the armature 28 is drawn upwardly toward the solenoid 30, consequently advancing the movable valve member 12 in an upward direction against bias spring 32. By way of example, with the present invention, the solenoid 30 may create an initial force on the order of 40 pounds which overcomes the net force of 20 pounds acting in the downward direction on the movable valve member 12. During initial movement of the movable valve member 12, the floating pin 16 follows the movable valve member 12 due to the upward force generated by the compression spring 22. In doing so, the upper surface 46 of the floating pin 16 remains seated in the valve seat 44 of movable valve member 12 (FIG. 2A). Consequently, the flow of high pressure fluid to the first outer annular recess 40 is not permitted and thus no pressurized supply fluid is permitted to pass through the space between the valve seat 38 and cooperating surface 60 of the movable valve member 12 to the drain passage 10 (see FIG. 2B). Once partially displaced, the radial flange 24 of the floating pin 16 contacts the shim 26, thus stopping any continued upward or advanced movement of the floating pin 16 (see FIG. 2C). As may be readily noted, the axial extent of shim 26 readily controls the distance over which floating pin 16 is allowed to travel. By way of example, the total reciprocal stroke of movable valve member 12 may be on the order of 0.006 inches. In accordance with the present invention, it is desirable to stop the simultaneous movement of the floating pin just prior to the completion of the valve stroke. In this instance, approximately 0.001 inches prior to the completion of the valve stroke. Accordingly, the shim 26 would necessarily be of an axial, dimension which permits the floating pin 16 to travel approximately 0.005 inches before contact is made with the radial flange 24 (see FIG. 1D).

Figure 3A:
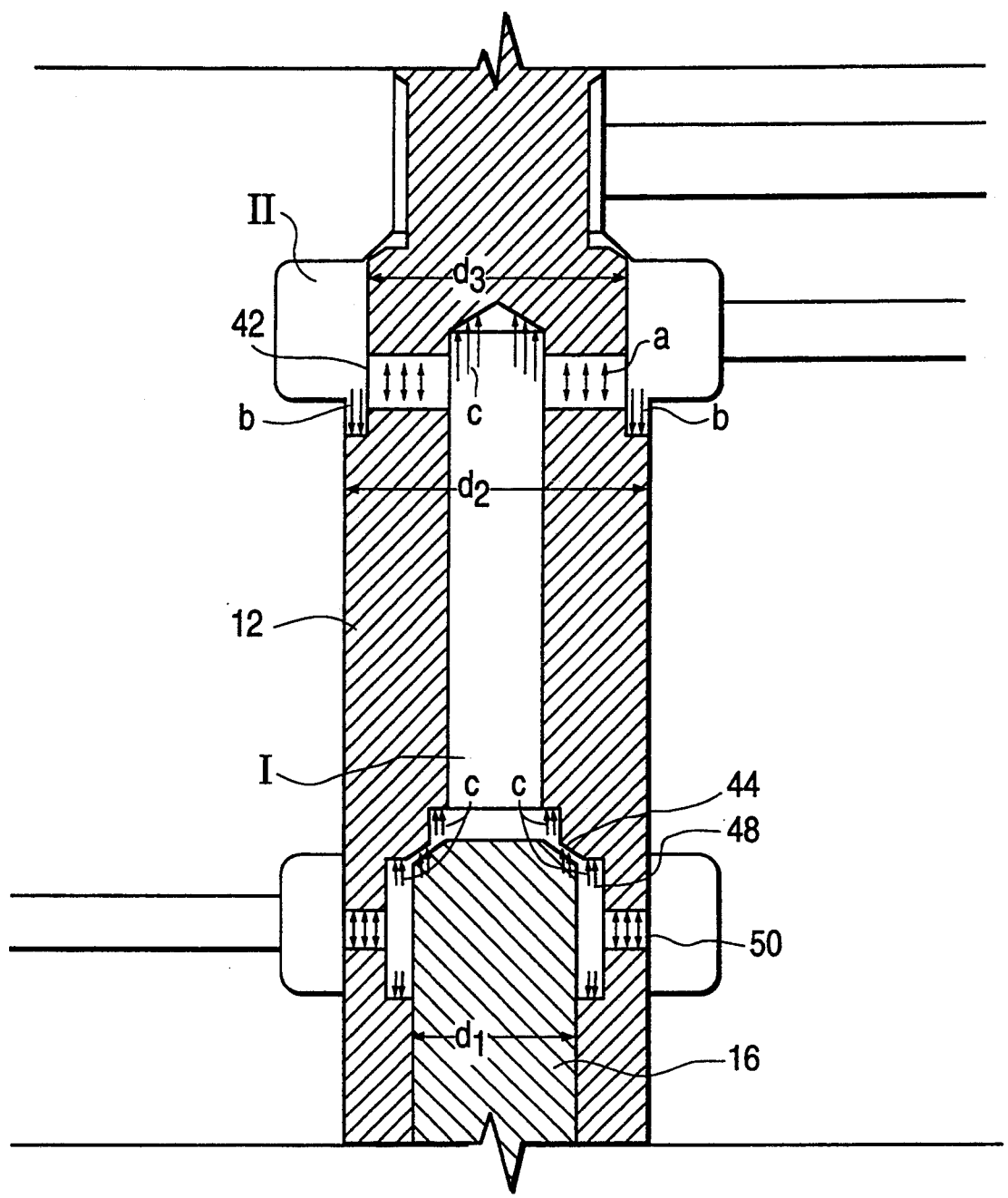
FIG. 3A is an expanded cross-sectional view of the portion of the three-way solenoid valve of FIG. 3 about the upper valve seat.
Figure 3B:
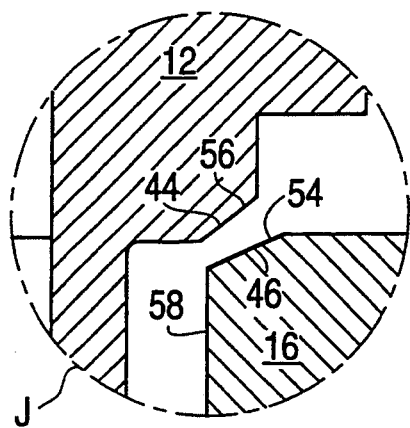
FIG. 3B is an expanded view of the area J of FIG. 3.

As is illustrated in FIG. 3, once the radial flange 24 contacts the shim 26, continued movement of the movable valve member 12 in an upward direction separates the upper surface 46 of the floating pin 16 from the valve seat 44 of the movable valve member 12 (see FIG. 3B). Once separated, the supply of pressurized fluid passing through the passage between the valve seat 44 and the upper surface 46 of the floating pin 16 will drive the floating pin 16 downwardly and once again into contact with the retraction stop 18 resulting in a spacing between the radial flange 24 and shim 26 (see FIG. 3D). Because the floating pin 16 travels with the movable valve member 12 during the initial movement of the movable valve member 12, transition losses to the drain passage 10 are minimized. That is, very little high pressure fluid is permitted to initially pass to the first outer annular recess 40 before movable valve member 12 is fully seated against valve seat 38.

To avoid any possibility of side loading, the end of floating pin 16 which contacts retraction stop 18 is formed with a slight crown. This arrangement lessens the possibility of significant side loading of floating pin 15 which may cause uneven wear and possible leakage of the telescoping ports.

As compared to previous three-way solenoid valves, a significant reduction in the wasteful flow of pressurized fluid directly to the drain passage is achieved. In valve applications, such as for fuel injection control where valve actuation is repeated at a very high frequency (hundreds of times per minutes in a typical engine operation) the significant reduction in undesired spill of high pressure fuel to drain can significantly reduce the amount of energy required from the engine to pressurize the engine fuel. This reduced parasitic energy loss is particularly large when the fuel system is designed to produce very high fuel pressures (i.e., greater than 20,000 psi).

Figure 3C:
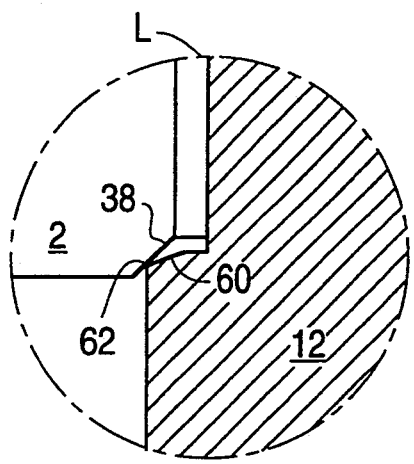
FIG. 3C is an expanded view of the area L of FIG. 3.
Figure 3D:
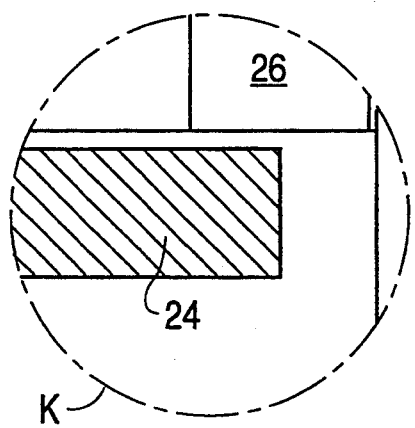
FIG. 3D is an expanded view of the area K of FIG. 3.

With further reference to FIG. 3, continued movement of the movable valve member 12 in an upward direction results in the seating of the movable valve member 12 in valve seat 38 (see FIG. 3C). The seating of the movable valve member 12 in valve seat 38 is illustrated in greater detail in FIG. 5.

Similar to the valve seat 44 illustrated in detail in FIG. 4, the movable valve member 12 includes the frusto-conical surface 60 which is of an incline with respect to the horizontal that is less than the incline of frusto-conical surface 62 of the housing 2. Again, as with the sealing surface illustrated in FIG. 4, a sharp contacting edge is concentrically formed about the movable valve member 12 which readily contacts the frusto-conical surface 62 of the valve seat 38. This arrangement of engaging conical surfaces, illustrated in FIG. 5, insures that the circular line of contact seal, formed by the engagement of frusto-conical surfaces 60 and 62 will have the same diameter as the outer shoulder of the movable valve number 12 shown in FIG. 5.

Referring now to FIG. 3A, in order for the three-way solenoid valve to be pressure balanced, it must be pressure balanced in both the energized and de-energized states. As discussed hereinabove, with reference to FIG. 1A, when in the de-energized state, the pressurized fluid acts against the same effective transverse areas in both the upward and downward directions against the movable valve member 12. Accordingly, in order for the three-way solenoid valve to be pressure balanced in the energized state, the pressurized fluid acting on the movable valve member 12 must again act against equal effective transverse area in both the upward and downward directions. As is the case in FIG. 1A, the pressurized fluid acting within the passage 50 and inner annular recess 48 are equal in both the upward and downward directions. Similarly, the pressurized fluid acting within the radial passage 42 is likewise equal in both the upward and downward directions as noted by arrows a. Accordingly, in order for the three-way solenoid valve to be pressure balanced in the energized state, the pressurized fluid acting downwardly on the movable valve member 12 noted by arrows b must be equal to the unbalanced pressurized fluid acting on movable valve member 12 in the upward direction as noted by arrows c. That is, the area created by the diameter $d_1$, the diameter of the floating pin 16, referred to as area $A_1$ must equal the area created by the diameter $d_2$, hereinafter $A_2$, minus the area created by diameter $d_3$, hereinafter area $A_3$. Mathematically, in order for the three-way solenoid valve to be pressure balanced in the energized state, the diameters must be so related so as to satisfy the formula:

$$A_1 = A_2 - A_3 \qquad (1)$$

Accordingly, as can be seen from FIG. 3A, the valve seats and hence the diameters $d_1$, $d_2$ and $d_3$ need be so related so as to satisfy the foregoing formula; however, none of these diameters need be identical. Consequently, with the present invention, a pressure balanced three-way solenoid valve is provided with valve seats having different size effective seal areas. That is, the valve seat provided between the high pressure fluid supply passage 6 and the outlet passage 8 may be of a smaller diameter than that of the valve seat provided between the outlet passage 8 and drain passage 10. By providing different size effective sealing areas, it is possible to realize different hydraulic behavior when opening the three-way valve as opposed to when closing the valve. For example, in fuel injection systems, it is often desirable to provide an injection rate which is slow at the beginning of the injection cycle and sharp at the end of injection. This being illustrated in FIG. 6.

As can be seen from FIG. 6, during the initial flow of pressurized fluid from the supply passage 6 to the outlet passage 8, the flow rate is low and increases over time. When the solenoid valve is de-energized, noted as X in FIG. 6, the flow of pressurized fluid to the outlet passage is sharply ended at the end of what may be an injection cycle. Accordingly, a fuel injection system employing such a pressure balanced three-way solenoid valve would exhibit controlled injection start-up and a quick response time.

When solenoid 30 is de-energized, the compression spring 32 forces the movable valve member 12 in a downward direction and into contact with the upper surface 46 of the floating pin 16. Some of this impact is absorbed by the compression spring 22. Moreover, with floating pin 16 and compression spring 22, the phenomenon known as "valve closing bounce" can be significantly reduced or is eliminated. That is, when movable valve member 12 contacts upper surface 46 of floating pin 16 and the floating pin is in contact with the retraction stop 18, movable valve member 12 would have a tendency to rebound and consequently move away from upper surface 46 of floating pin 16. In order to compensate for this phenomena, compression spring 22 forces the floating pin upwardly against movable valve member 12 such that floating pin 16 follows movable valve member 12 if such member should rebound and consequently maintains upper surface 46 of floating pin 16 seated in the valve seat 44 during any bounce of movable valve member 12 which may occur. This in turn eliminates any leakage path between valve seat 44 and upper surface 46 which would otherwise be created.

As an alternative to the type of biasing arrangement illustrated in FIGS. 1-3, it would be possible to spring bias movable valve member 12 toward the position illustrated in FIG. 3. In such a case, the solenoid would take the form illustrated and discussed in greater detail with respect to FIGS. 10-12 wherein the armature is positioned on a side of the solenoid opposite movable valve member such that the solenoid actually "pushes" the valve member away from the solenoid when the valve is actuated.

Figure 7:
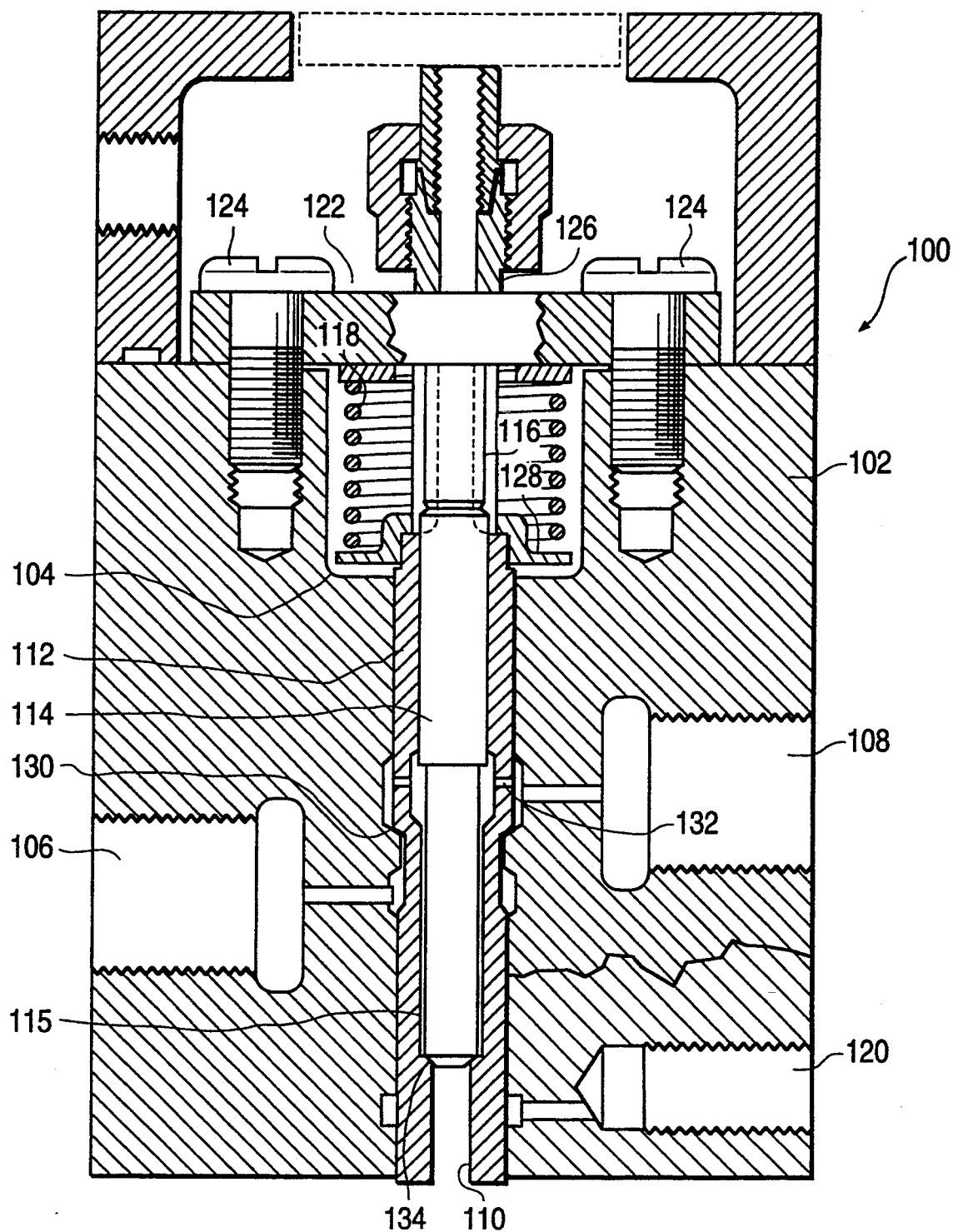
FIG. 7 is a cross-sectional view of a force balanced three-way solenoid valve in accordance with an alternative embodiment of the present invention.
Figure 8:
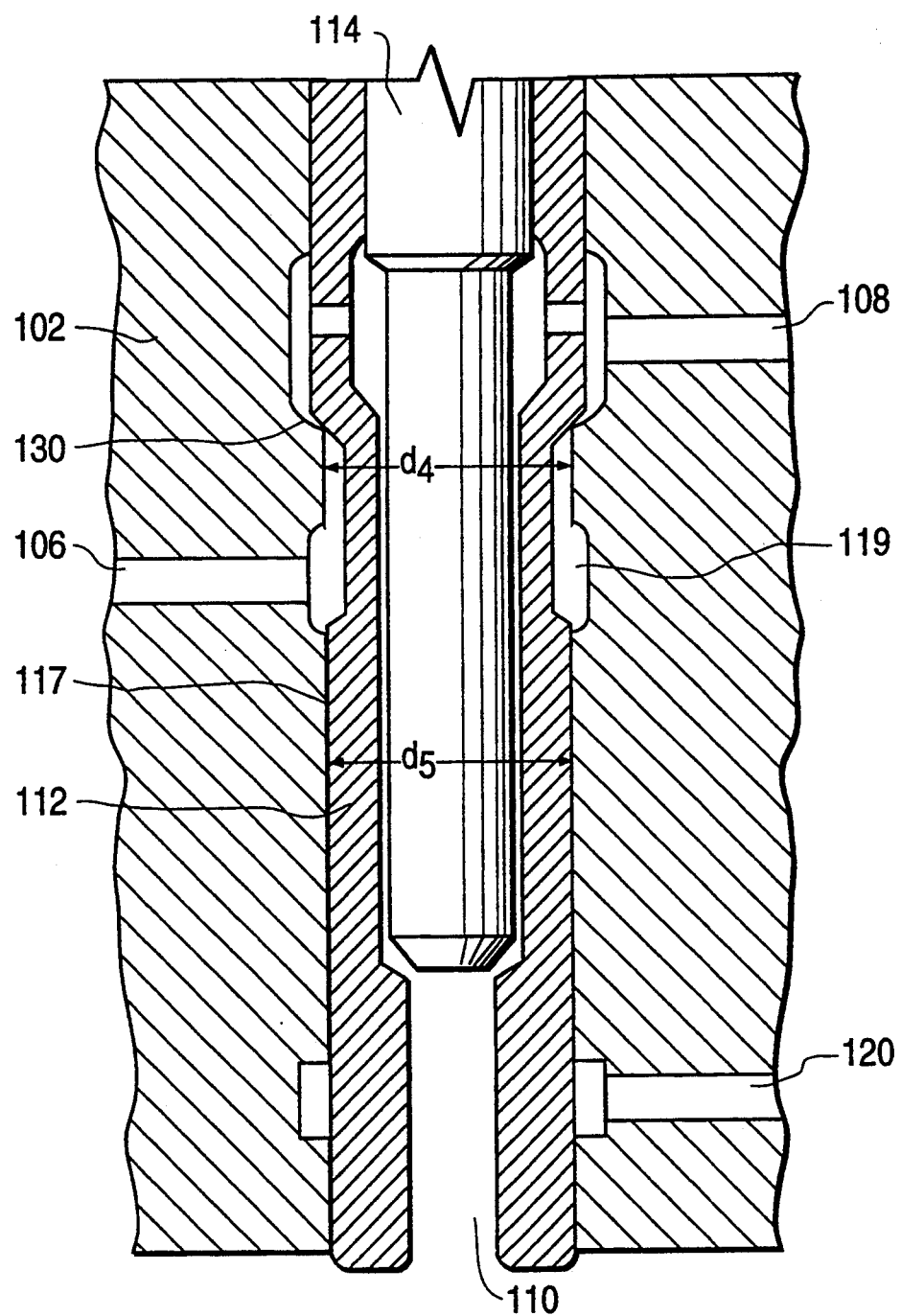
FIG. 8 is an expanded cross-sectional view of the force balanced three-way solenoid valve illustrated in FIG. 7 in the de-energized state.
Figure 9:
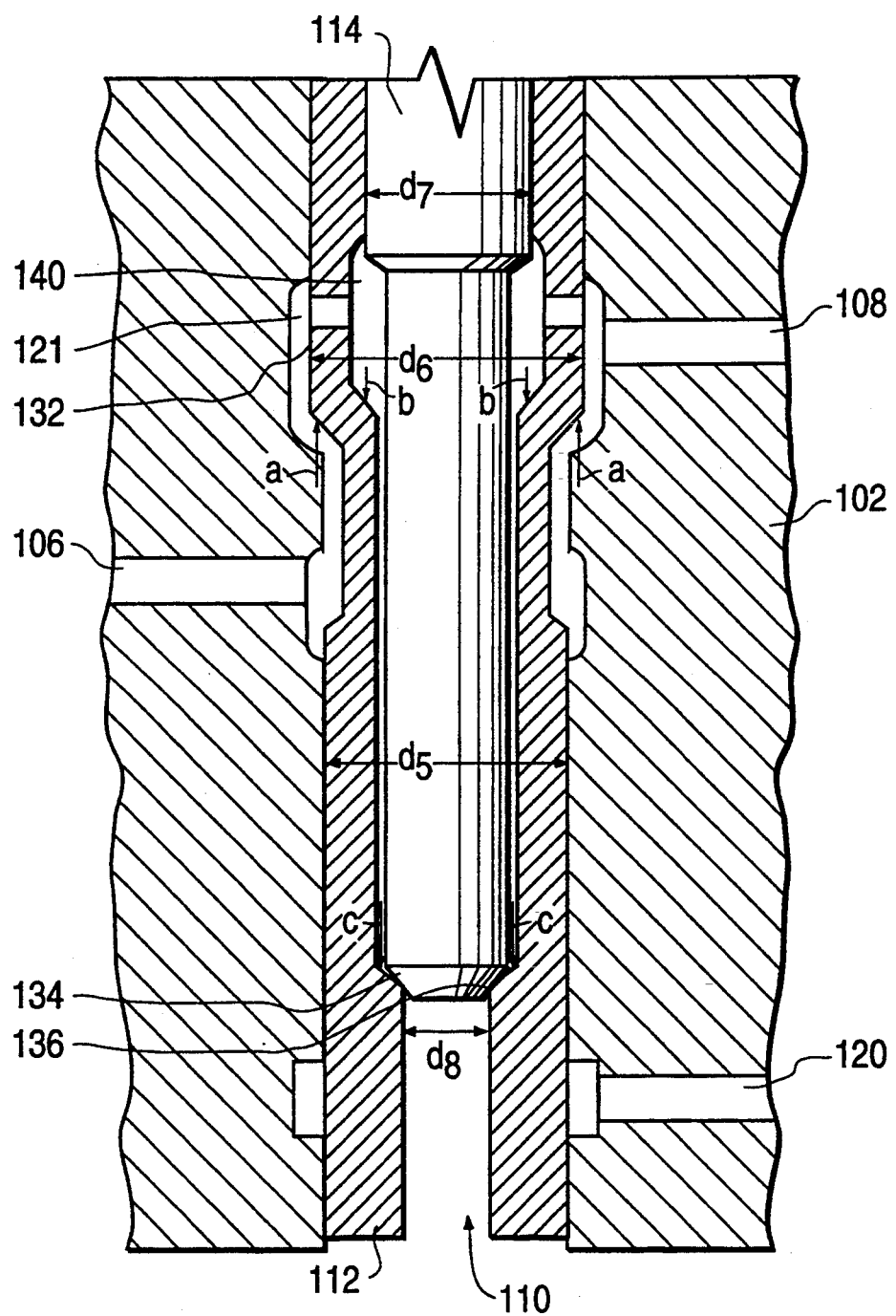
FIG. 9 is an expanded cross-sectional view of the force balanced three-way solenoid valve illustrated in FIG. 7 in the energized state.

Referring now to FIGS. 7 through 9, a pressure balanced three-way solenoid valve assembly designed in accordance with an alternative embodiment of the present invention will be described in greater detail. As with the previous embodiment, the three-way solenoid valve 100 includes a housing 102 having a valve chamber 104 therein and includes a pressurized fluid supply passage 106 and an outlet passage 108 fluidically communicating with the valve chamber 104. A drain passage 110 is provided in a cavity 115 of a movable valve member 112 which also receives a floating pin 114. Upward movement of the floating pin 114 is limited by the stop 116 and the movable valve member 112 is biased in a downward direction by a compression spring 118. Also provided in the housing 102 is a scavenge passage 120 which fluidically communicates with the valve chamber 104 in a conventional manner.

The stop 116 as well as an upper end of the compression spring 118 are maintained in a fixed position by cross pin 122 which is fixedly secured to the housing 102 by way of bolts 124. An extension 126 of the movable valve member 112 is slotted to accommodate cross pin 122. At its upper end, extension 126 is connected to an armature in a conventional manner which is attracted by an electromagnetic solenoid for moving the movable valve member 112 in a desired manner. A flange 128 extends from the movable valve member 112 and is contacted by a second end of the compression spring 118 in order to bias the movable valve member in a downward direction and into contact with valve seat 130 formed in the housing 102 when the valve is in the de-energized state.

When the movable valve member 112 is seated in the valve seat 130, the outlet passage 108 fluidically communicates with the drain passage 110 through a radial passage 132 formed in the movable valve member 112 and the cavity 115 of the movable valve member 112. Accordingly, the floating pin 114 is spaced from the valve seat 134 formed in the movable valve member 112. This being clearly illustrated in FIG. 8.

Referring to FIG. 8, the three-way solenoid valve is pressure balanced in the de-energized state so long as the diameter $d_4$ of the valve seat 130 is equal to diameter $d_5$ of the portion 117 of the movable valve member 112 directly below the high pressure fluid chamber 119 which forms a portion of the outer annular recess 121. Hence, by providing equal diameters in this region, the forces acting in both the upward and downward direction on the movable valve member 112 in the de-energized state will be equal.

Referring to FIG. 9, the three-way solenoid valve is illustrated in the energized state wherein the movable valve member 112 is raised upwardly by an electromagnetic solenoid (not illustrated), such that a frusto-conical end surface 136 of the floating pin 114 is seated in the valve seat 134 of the movable valve member 112. When in this position, the pressurized fluid from the pressurized fluid supply passage 106 is permitted to flow to the outlet passage 108 by way of radial passage 132 as well as the chamber 140. Likewise, fluid communication between the outlet passage 108 and drain passage 110 is sealed due to the seating of the floating pin 114 in the valve seat 134 of the movable valve member 112.

As with the previous embodiment, in order for the three-way solenoid valve to be pressure balanced in the energized state, the fluid pressure forces acting in the upward direction must equal those acting in the downward direction and consequently the effective surface area of the movable valve member 112 exposed to pressurized fluid in the upward direction must equal that in the downward direction. The non-directly compensated forces acting on the movable valve member 112 in the upward direction are designated by arrows a in FIG. 9, while the pressure forces acting in the downward direction which are not directly compensated for are noted by arrows b and c. The effective surface area on which pressurized fluid acts which is designated by arrows a is equal to the area created by diameters $d_6$, hereinafter $A_6$, minus the area created by the diameter $d_5$, hereinafter $A_5$. Similarly, the forces acting on the movable valve member 112 in the downward direction designated by arrows b and c act over an effective area created by the diameter $d_7$, hereinafter $A_7$, minus the area created by the diameter $d_8$, hereinafter $A_8$. Restated mathematically, the effective areas created by the diameters $d_6$ minus $d_5$ and $d_7$ minus $d_8$ must satisfy the formula:

$$A_6 - A_5 = A_7 - A_8 \qquad (2)$$

Accordingly, as with the previous embodiment, it is clear that while the diameters of the valve seats $d_5$ and $d_8$ need not be identical, the valve seats must be so related to the diameter of the movable valve member 112 and floating pin 114 so as to satisfy the above noted formula.

Figure 10:
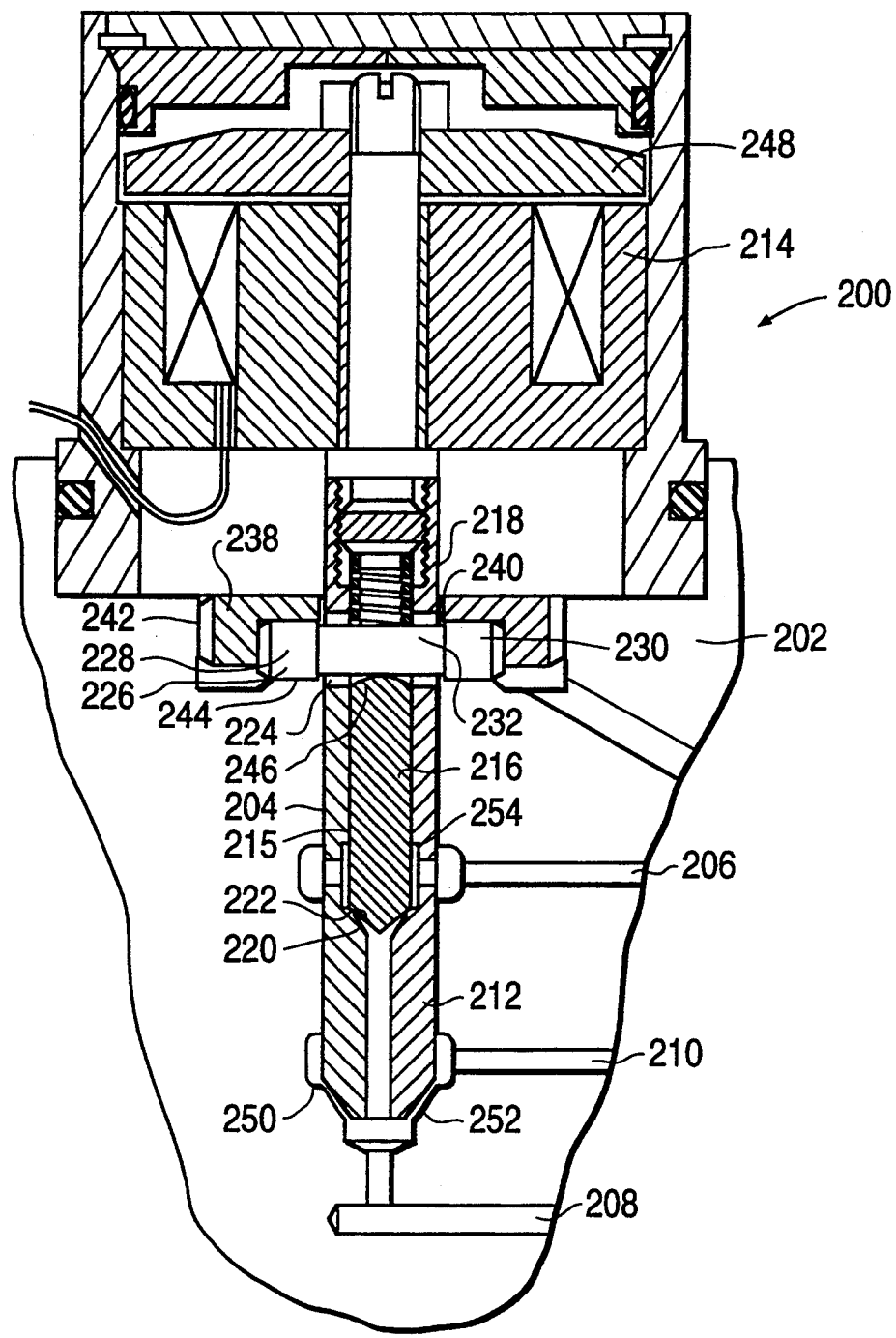
FIG. 10 is a cross-sectional view of a force balanced three-way solenoid valve in accordance with a further alternative embodiment of the present invention in the de-energized.
Figure 11:
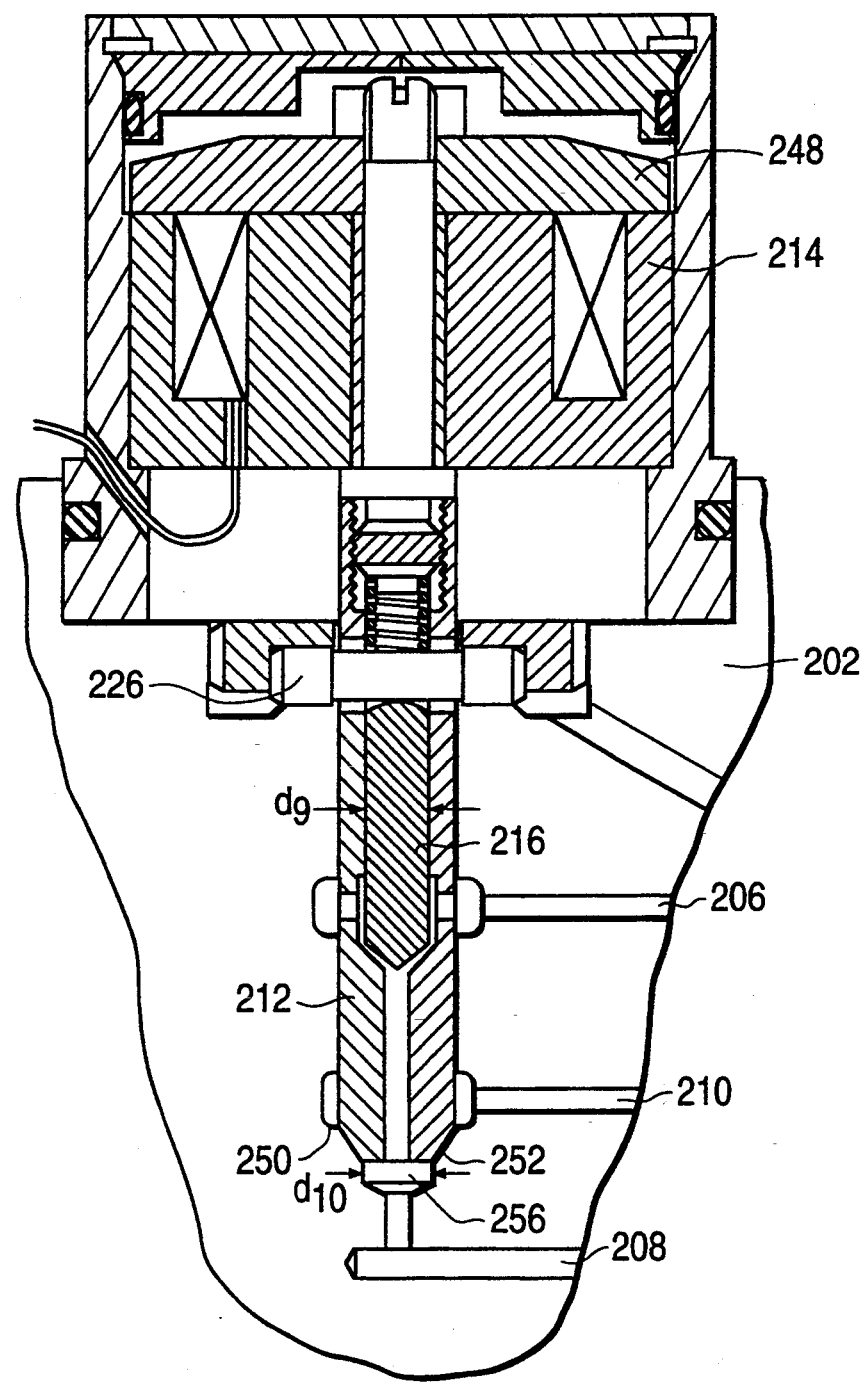
FIG. 11 is a cross-sectional view of the force balanced three-way solenoid valve illustrated in FIG. 10 in the energized state.
Figure 12:
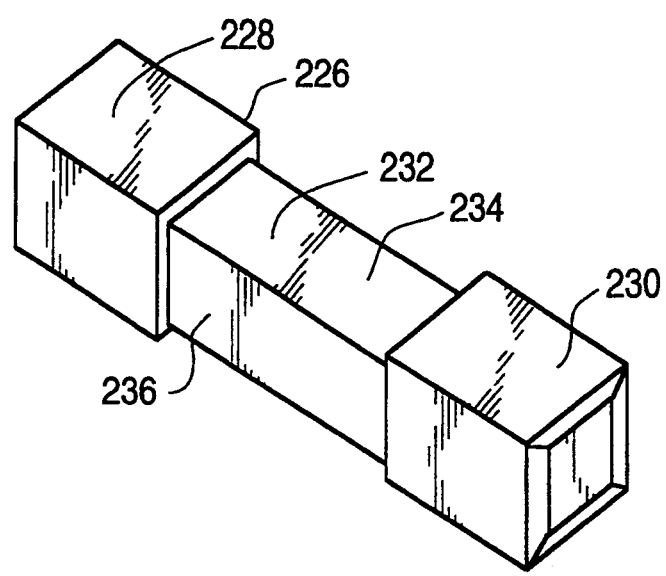
FIG. 12 is a perspective view of the pin used for setting the predetermined valve stroke of the force balanced three-way solenoid valve of FIG. 10.

With reference now being made to FIGS. 10 through 12, a further embodiment of the present invention will be discussed in greater detail.

Referring initially to FIG. 10, a pressure balanced three-way solenoid valve including a housing 202 having a valve chamber 204 formed therein and a high pressure fluid supply passage 206, an outlet passage 208 and a drain passage 210 communicating with the valve chamber. Also, positioned within the valve chamber 204 is a movable valve member 212 which may be readily displaced by an electromagnetic solenoid 214. The movable valve member 212 includes a cavity 215 having a floating pin 216 disposed therein. A compression spring 218 is provided within the cavity 215 for forcing the movable valve member 212 upwardly against a sealing surface 220 of the floating pin 216. The sealing surface 220 cooperates with a valve seat 222 which is concentrically form in the cavity 215 of the movable valve member 212. The movable valve member 212 further includes a transverse opening 224 for receiving a valve stroke adjustment pin 226 therethrough. The valve stroke adjustment pin 226 includes end portions 228 and 230 which are of a substantially square cross section and an intermediate portion 232 including recessed surfaces. The pin 226 is illustrated in greater detail in FIG. 12.

As can be seen from FIG. 12, the end portions 228 and 230 of the pin 226 are substantially square in cross section and the intermediate portion 232 of the pin includes recessed surfaces of which surfaces 234 and 236 are illustrated. Each of the intermediate surfaces 234 and 236 as well as those surfaces not illustrated, are recessed a predetermined distance from respective surfaces formed by the end portions 228 and 230 with the depth of each of the recessed surfaces varying with respect to an adjacent surface. Accordingly, when the pin 226 is positioned in the valve housing 202 and prior to being maintained in a fixed position by a retainer 238, the pin 226 may be rotated to any desired position in order to provide an upper limit to the floating pin 216 and thus an upper limit to the movement of the movable valve member 212. The retainer 238 includes a central opening 240 for receiving the movable valve member 212 therethrough and threads 242 for threadedly engaging the valve housing 202 in order to assure that the pin 226 is securely pressed against the surface 244 of the valve housing 202. It can be further noted that an upper surface 246 of the floating pin 216 is concave outwardly in the form of a crown in order to eliminate the possibility of any side loading of the piston which may inhibit the free movement of the movable valve member 212.

When energized, as is illustrated in FIG. 11, the movable valve member 212 is displaced downwardly by the attraction of radial flange 248 toward the solenoid 214. Because the radial flange 248 is secured to an extension of the movable valve member 212, the movable valve member 212 is displaced or pushed downwardly with a sealing surface 250 of the movable valve member 212 contacting a valve seat 252 formed in the housing 202. In doing so, the fluid flow path between the high pressure fluid supply passage 206 and the outlet passage 208 is opened while the fluid communication between the outlet passage 208 and drain passage 210 is sealed.

As with the previous embodiments, the three-way solenoid valve, illustrated in FIG. 10 in the de-energized condition, is pressure balanced in that the fluid pressure forces acting upwardly on the movable valve member 212 within the high pressure chamber 254 as well as the fluid pressure forces acting downwardly within such chamber are equalized. With respect to the valve in the energized state as illustrated in FIG. 11, in order for the valve to be pressure balanced in the energized state, the diameter $d_9$ of the floating pin 216 must be equal to the diameter $d_{10}$ of the chamber 256 formed below the movable valve member 212. That is, the valve seats 222 and 252 must be equal in order to assure that the three-way solenoid valve in accordance with this embodiment of the present invention is pressure balanced in both the energized and de-energized states.

While the present invention has been described with reference to a preferred an alternative embodiments, it should be appreciated by those skilled in the art that the invention may be practiced otherwise than as specifically described herein without departing from the spirit and scope of the invention. It is, therefore, to be understood that the spirit and scope of the invention be limited only by the appended claims.

INDUSTRIAL APPLICABILITY

As discussed hereinabove, the pressure balanced three-way solenoid valve of the present invention may be readily adapted to control the flow of air, hydraulic fluid or fuel in a variety of known pneumatic, hydraulic and fuel systems where high pressure fuel is being supplied to a load device. This load device may be a pneumatic or hydraulic cylinder or may be one or more fuel injectors of an internal combustion engine. Particularly, the pressure balanced three-way solenoid valve of the present invention can be utilized to control the injection cycle of an internal combustion engine wherein it is desired to control the initial start of injection by providing a slow start and a sharp end to the injection cycle.

What is claimed is:

1. A pressure balanced three-way valve assembly, comprising
    a valve housing containing a valve chamber and first, second and third valve passages communicating with said valve chamber;
    a movable valve member mounted for reciprocal movement within said valve chamber between first and second positions;
    a first valve seat associated with said movable valve member, said first valve seat being positioned to be closed when said movable valve member is in said first position to seal said third valve passage from the said first and second valve passages and allow fluid communication between said first and second valve passage;
    a second valve seat associated with said movable valve member, said second valve seat being positioned to be closed when said movable valve member is in said second position to seal said second valve passage from said first and third valve passages and allow fluid communication between said first and third valve passages, said first valve seat having an effective seal area which is substantially different from the effective seal area of said second valve seat; and
    force balancing means for balancing fluid pressure forces tending to move said movable valve member in opposite directions resulting from supply fluid pressure acting on said movable valve member causing said movable valve member to be fluid force balanced while both in said first position and in said second position.

2. A valve assembly as defined by claim 1, wherein a diameter of said first valve seat is less than a diameter of said second valve seat.

3. A valve assembly as defined by claim 1, wherein said movable valve member contains a cavity opening into at least one end of said movable valve member and wherein said valve assembly further includes a stop means for defining one of said first and second positions of said movable valve member, said stop means including a floating pin arranged to be telescopingly received within said cavity of said movable valve member.

4. A valve assembly as defined by claim 3, wherein said first valve seat is formed between said movable valve member and said valve housing and said second valve seat is formed between said floating pin and said movable valve member.

5. A valve assembly as defined by claim 4, wherein said floating pin has a sufficiently close sliding fit with the inside surface of said cavity of said movable valve member to form a fluid seal, said movable valve member containing an inner annular recess at one end of said cavity adjacent said second valve seat, said valve housing containing a first outer annular recess communicating with said valve chamber and axially positioned adjacent said first valve seat and a second outer annular recess communicating with said valve chamber and axially positioned adjacent said inner annular recess when said movable valve member is located in its second position, said first and second outer annular recesses being fluidically connected by a first radial passage contained in said movable valve member extending between said first outer annular recess and said cavity of said movable valve member, said second valve seat, said inner annular recess, a second radial passage extending between said inner annular recess and said second outer annular recess.

6. A valve assembly as defined by claim 5, wherein said movable valve element has a sufficiently close sliding fit with the inside surface of said valve chamber to form a fluid seal along substantially the entire length of said movable valve member extending between said first and second outer annular recesses and extending beyond said second outer annular recess to seal said second outer annular recess against fluid leakage between said valve housing and said movable valve member.

7. A valve assembly as defined by claim 6, wherein said first valve passage is connected with said first annular outer recess to form a passage for fluid flowing from said valve assembly and said second valve passage is connected with said second annular outer recess to form a passage for supplying fluid under relatively high pressure to said valve assembly and wherein said cavity contained within said movable valve member extends from said second valve seat to a location axially aligned with the first annular outer recess, whereby a fluid flow path is formed when said movable valve member is in its first position from said second valve passage to said first valve passage through said second outer annular recess, said second radial passage, said second valve seat, said movable valve member cavity, and said first radial passage.

8. A valve assembly as defined by claim 7, wherein said third valve passage is connected with said valve chamber for draining fluid at a low pressure from said valve chamber at a location axially spaced from said first annular outer recess in a direction away from said second annular outer recess and fluidically connected with said first outer annular recess through said first valve seat when said movable valve member is in its second position, said third valve passage being fluidically isolated from said first outer annular recess when said movable valve member is in its first position.

9. A valve assembly as defined by claim 8, wherein said force balancing means includes said floating pin having an effective transverse cross-sectional seal area within said cavity of said movable valve member, said movable valve member having an effective transverse cross-sectional seal area between said first and second outer annular cavities and said first valve seat having an effective seal area, wherein the effective transverse cross sectional seal area of said floating pin within said cavity of said movable valve member is equal to the difference between
 the effective transverse cross sectional seal area of said movable valve member between said first and second outer annular cavities, and
 the effective seal area of said first valve seat, whereby said movable valve member is fluid force balanced when said movable valve member is in its first position.

10. A valve assembly as defined by claim 9, wherein said force balancing means further includes said second valve seat having an effective seal area and wherein the effective transverse cross sectional seal area of said floating pin within said cavity of said movable valve member is equal to the effective seal area of said second valve seat whereby said movable valve member is fluid force balanced when said movable valve member is in its second position.

11. A valve assembly as defined by claim 10, further including a first biasing means for applying a retracting force against said movable valve member toward its second position and solenoid means for advancing said movable valve member toward its first position when energized and for allowing said movable valve member to retract to its second position when de-energized.

12. A valve assembly as defined by claim 11, wherein said stop means includes a movement limiting means adjacent an end thereof remote from said second valve seat, said movement limiting means including a retraction stop for arresting retraction of said floating pin and said movable valve member to define said second position of said movable valve member in which said second valve seat is closed and an advancement stop for arresting advancement of said floating pin before said movable valve member reaches its first position closing said first valve seat.

13. A valve assembly as defined by claim 12, further comprising a second biasing means for applying an advancing force on said floating pin toward said advancement stop, the advancing force of said second biasing means being less than the retracting force of said first biasing means.

14. A valve assembly as defined by claim 13, wherein said solenoid means includes an electromagnetic coil for creating a magnetic field when energized and an armature connected to said movable valve member, said armature being positioned adjacent said electromagnetic coil such that energization of said electromagnetic coil attracts said armature to advance said movable valve member against the retracting force of said first biasing means toward said first position of said movable valve member, said floating pin advancing with said movable valve member in response to said advancing force of said second biasing means to keep said second valve closed until said floating pin encounters said advancement stop.

15. A valve assembly as defined by claim 14, wherein said floating pin includes a radial flange arranged to engage said advancement stop, said advancement stop including a replaceable annular shim whose axial length determines the location at which advancement of said floating pin is arrested during advancement of said movable valve member toward its first position.

16. A valve assembly as defined by claim 15, wherein said retraction stop is axially adjustable to vary axially said second position of said movable valve member.

17. A valve assembly as defined by claim 16, wherein said advancement stop is adapted to arrest advancement of said floating pin just before said first valve seat is closed to cause said second valve seat to open to allow fluid to pass through said second valve seat to create a fluid force on said floating pin which overcomes the force of said second biasing means and returns said floating pin into engagement with said retraction stop to fully open said second valve seat.

18. A valve assembly as defined by claim 4, wherein said floating pin has a sufficiently close sliding fit with the inside surface of said cavity of said movable valve member to form a fluid seal, said movable valve member containing an inner annular recess adjacent said first valve seat, said valve housing containing an outer annular recess communicating with said valve chamber and axially positioned adjacent said first valve seat, said inner and outer annular recesses being fluidically connected by a first radial passage contained in said movable valve member.

19. A valve assembly as defined by claim 18, wherein said moveable valve element has a sufficiently close sliding fit with the inside surface of said valve chamber to form a fluid seal extending in opposite axial directions from said outer annular recess to seal said outer annular recess against fluid leakage between said valve housing and said movable valve member.

20. A valve assembly as defined by claim 19, wherein said first passage is connected with said outer annular recess to form a passage for fluid flowing from said valve assembly and said third valve passage is also connected with said annular outer recess to form a passage for supplying fluid under relatively high pressure to said valve assembly and wherein said first valve seat is associated with said outer annular recess to isolate said third valve passage from said first valve passage when said movable valve element is in its first position.

21. A valve assembly as defined by claim 20, wherein said second valve passage is connected with said valve chamber for draining fluid at a low pressure from said valve chamber, said second valve passage including a portion of said movable valve member cavity, said second valve passage being isolated from said inner annular recess of said movable valve member when said movable valve member is in its second position.

22. A valve assembly as defined by claim 21, wherein the difference between
 the effective transverse cross sectional seal area of said floating pin within said cavity of said movable valve member, and
 the effective transverse cross sectional seal area of said movable valve member within said valve chamber at the same axial location as said floating pin seal area,
is equal to the difference between
 the effective seal area of said second valve seat, and
 the effective transverse cross sectional seal area of said movable valve member at the same axial location as said second valve seat,
whereby said movable valve member is fluid force balanced when said movable valve member is in its second position.

23. A valve assembly as defined by claim 22, wherein the effective seal area of said second valve seat is equal to the effective transverse cross sectional seal area of said movable valve member within said valve chamber adjacent the portion of said outer annular recess which is in communication with said second valve passage, whereby said movable valve member is fluid force balanced when said movable valve member is in its second position.

24. A pressure balanced three-way valve assembly, comprising
 a valve housing containing a valve chamber and first, second and third valve passages communicating with said valve chamber;
 a movable valve member mounted for reciprocal movement within said valve chamber between first and second positions, said movable valve member containing a cavity opening into at least one end of said movable valve member;
 a stop means for defining one of said first and second positions of said movable valve member, said stop means including a floating pin arranged to be telescopingly received within said cavity of said movable valve member;
 a first valve seat associated with said valve housing and said movable valve member, said first valve seat being positioned to be closed when said movable valve member is in said first position to seal said third valve passage from the said first and second valve passages and allow fluid communication between said first and second valve passages through said valve chamber;
 a second valve seat associated with said movable valve member, said second valve seat being positioned to be closed when said movable valve member is in said second position to seal said second valve passage from said first and third valve passages and allow fluid communication between said first and third valve passages; and
 force balancing means for balancing fluid pressure forces tending to move said movable valve member in opposite directions resulting from supply fluid pressure acting on said movable valve member causing said movable valve member to be fluid force balanced while both in said first position and in said second position; and
 wherein said stop means further includes an adjustable retraction stop located within said valve housing for engaging one end of said floating pin to determine said second position when said movable valve member is retracted from said first position.

25. A valve assembly as defined by claim 24, wherein the effective seal area of said first valve seat and the effective seal area of said second valve seat are equal.

26. A valve assembly as defined by claim 25, wherein said movable valve member reciprocates through a predetermined valve stroke between said first and second positions.

27. A valve assembly as defined by claim 26, further comprising a biasing means for applying a retracting force to said movable valve member and said floating pin toward said retraction stop.

28. A valve assembly as defined by claim 27, further including a solenoid and an armature connected to said movable valve member, said solenoid being positioned adjacent the armature such that energization of the solenoid attracts said armature and advances said movable valve member toward said first position.

29. A valve assembly as defined by claim 28, wherein said retraction stop is adjustable to adjust the length of said predetermined valve stroke.

30. A valve assembly as defined by claim 29, wherein said retraction stop includes a cross pin extending through a slot in said movable valve member transverse to the direction of movement of said movable valve member.

31. A valve assembly as defined by claim 30, wherein ends of said cross pin are of a square cross-section and an intermediate portion of at least one surface of said pin is recessed.

32. A valve assembly as defined by claim 30, wherein an intermediate portion of each surface of said pin is recessed, each recess being of varying depth as compared to a recess of an adjacent side surface.

33. A valve assembly as defined by claim 32, wherein said second end of said floating pin is adapted to contact an intermediate portion of one of said side surfaces and said biasing means includes a spring, one end of said spring contacts an intermediate surface of an opposing side surface of said pin and the other end of said spring engages said movable valve member to urge said movable valve member toward its second position.

34. A valve assembly as defined by claim 33, wherein said second end of said floating pin is crowned to prevent side loading of said floating pin when said floating pin is biased against said cross pin.

35. A pressure balanced three-way valve assembly, comprising
 a. a valve housing containing a valve chamber and first, second and third valve passages communicating with said valve chamber;
 b. a movable valve member mounted for reciprocal movement within said valve chamber between
  i. a first position in which said third valve passage is isolated from said first and second valve passages and said first and second valve passages are in fluid communication, and
  ii. a second position in which said second valve passage is isolated from said first and third valve passages and said first and third passages are in fluid communication;
 c. a solenoid operator means for controlling the valve assembly by displacing said movable valve member between said first and second positions, said solenoid operator means being mounted on one side of said valve housing; and d. stop means mounted on said valve housing opposite said solenoid operator means for permitting adjustment in one of said positions of said movable valve means including a floating pin telescopingly received in one end of said movable valve member and an adjustable retraction stop mounted to engage one end of said floating pin when said movable valve member is moved to one of said positions, said retraction stop being selectively adjustable to vary said corresponding position of said movable valve member.

36. A pressure balanced three-way valve assembly, comprising
   a. a valve housing containing a valve chamber and first, second and third valve passages communicating with said valve chamber;
   b. a movable valve member mounted for reciprocal movement within said valve chamber between
      i. a first position in which said third valve passage is isolated from said first and second valve passages and said first and second valve passages are in fluid communication, and
      ii. a second position in which said second valve passage is isolated from said first and third valve passages and said first and third passages are in fluid communication,
   said movable valve member containing a cavity opening into one end of said movable valve member;
   c. a floating pin telescopingly received within said cavity of said movable valve member;
   d. a first valve seat located within said valve chamber and positioned to be closed when said movable valve member is in said first position to isolate said third valve passage from said first and second valve passages and allow fluid communication between said first and second valve passages;
   e. a second valve seat located within said cavity of said movable valve member, said second valve seat being positioned to be closed by said floating pin when said movable valve member is in said second position to seal said second passage from said first and third valve passages and allow fluid communication between said first and third valve passages;
   f. force balancing means for balancing fluid pressure forces tending to move said movable valve member in opposite directions resulting from supply fluid pressure acting on said movable valve member causing said movable valve member to be fluid force balanced while both in said first position and in said second position;
   g. biasing means for causing said floating pin to follow said movable valve member to keep said second valve seat closed as said movable valve member is advanced toward said first position from said second position; and
   h. advancement stop means for preventing said floating pin from following said movable valve member all of the way to said first position to insure thereby that said second valve seat is opened before said movable valve member reaches said first position.

37. A valve assembly as defined by claim 36, wherein said second valve passage is connectable to a supply of high pressure fluid whereby upon engagement of said advancement stop by said floating pin and further advancement of said movable valve means, said second valve seat is opened to cause said floating pin to be subjected to the high pressure fluid to force said floating pin to be returned to its fully retracted position to thereby open fully said second valve.

38. A pressure balanced three-way valve assembly, comprising
   a. a valve housing containing a valve chamber and first, second and third valve passages communicating with said valve chamber;
   b. a movable valve member mounted for reciprocal movement within said valve chamber between
      i. a first position in which said third valve passage is isolated from said first and second valve passages and said first and second valve passages are in fluid communication, and
      ii. a second position in which said second valve passage is isolated from said first and third valve passages and said first and third passages are in fluid communication,
   said movable valve member containing a cavity opening into one end of said movable valve member;
   c. a floating pin telescopingly received within said cavity of said movable valve member;
   d. a first valve seat located within said valve chamber and positioned to be closed when said movable valve member is in said first position to isolate said third valve passage from said first and second valve passages and allow fluid communication between said first and second valve passages;
   e. a second valve seat located within said cavity of said movable valve member, said second valve seat being positioned to be closed by said floating pin when said movable valve member is in said second position to seal said second passage from said first and third valve passages and allow fluid communication between said first and third valve passages;
   f. force balancing means for balancing fluid pressure forces tending to move said movable valve member in opposite directions resulting from supply fluid pressure acting on said movable valve member causing said movable valve member to be fluid force balanced while both in said first position and said second position,
   g. stop means for engaging said floating pin upon return of said movable valve member to define said second position; and
   h. biasing means for biasing said floating pin toward said movable valve member to cushion the impact of said floating pin with said stop means.

39. A pressure balanced three-way valve assembly, comprising
   a valve housing containing a valve chamber and first, second and third valve passages communicating with said valve chamber;
   a movable valve member mounted for reciprocal movement within said valve chamber between first and second positions, said movable valve member forming a closely fitting, fluid seal forming first gap with said valve housing, said movable valve member containing a cavity opening into at least one end of said movable valve member;
   a stop means for defining one of said first and second positions of said movable valve member, said stop means including a floating pin arranged to be telescopingly received within said cavity, said floating pin forming a closely fitting, fluid seal forming second gap with said movable valve member;
   a first valve seat associated with said valve housing and said movable valve member, said first valve seat being positioned to be closed when said movable valve member is in said first position to seal said third valve passage from the said first and second valve passages and allow fluid communication between said first and second valve passages through said valve chamber;

a second valve seat associated with said movable valve member, said second valve seat being positioned to be closed when said movable valve member is in said second position to seal said second valve passage from said first and third valve passages and allow fluid communication between said first and third valve passages;

wherein said movable valve member includes fluid leakage reduction means for reducing the amount of fluid allowed to leak through said first and second gaps, said fluid leakage reduction means including a small passage contained in said movable valve means for interconnecting said first and second gaps.

40. A valve assembly as defined by claim 39, wherein said first and second gaps communicate at one end with a high fluid pressure and at the other end with a low fluid pressure, said first gap being deformed differently by fluid pressure as compared with said second gap.

41. A valve assembly as defined by claim 40, wherein said small passage is positioned closer to the low pressure end than to the high pressure end of said gaps.

42. A pressure balanced three-way valve assembly, comprising:

a valve housing containing a valve chamber, and a supply passage, an outlet passage and a drain passage, each communicating with said valve chamber;

a movable valve member mounted for reciprocal movement within said valve chamber between first and second positions, said movable valve member containing a cavity opening into at least one end of said movable valve member;

solenoid means for advancing said movable valve member toward its second position when energized and for allowing said movable valve member to retract to its first position when de-energized;

a stop means for defining one of said first and second positions of said movable valve member, said stop means including a floating pin arranged to be telescopingly received within said cavity of said movable valve member;

a first valve seat associated with said movable valve member, said first valve seat being positioned to be closed when said movable valve member is in said first position to seal said supply passage from the said outlet passage and said drain passage and allow fluid communication between said outlet passage and drain passage through said valve chamber;

a second valve seat associated with said movable valve member, said second valve seat being positioned to be closed when said movable valve member is in said second position to seal said drain passage from said outlet passage and said supply passage and allow fluid communication between said outlet passage and said supply passage; and force balancing means for balancing fluid pressure forces tending to move said movable valve member in opposite directions resulting from supply fluid pressure acting on said movable valve member causing said movable valve member to be fluid force balanced while both in said first position and in said second position.

43. A pressure balanced three-way valve assembly, comprising:

a valve housing containing a valve chamber, and a supply passage, an outlet passage and a drain passage, each communicating with said valve chamber;

a movable valve member mounted for reciprocal movement within said valve chamber between first and second positions, said movable valve member including a first end and a second end spaced axially from said first end, said movable valve member containing a cavity opening into at least one said first and said second ends of said movable valve member;

a stop means for defining one of said first and second positions of said movable valve member, said stop means including a floating pin arranged to be telescopingly received within said cavity of said movable valve member;

a first valve seat associated with said movable valve member, said first valve seat being positioned to be closed when said movable valve member is in said first position to seal said supply passage from the said outlet passage and said drain passage and allow fluid communication between said outlet passage and drain passage through said valve chamber;

a second valve seat associated with said movable valve member, said second valve seat being positioned to be closed when said movable valve member is in said second position to seal said drain passage from said outlet passage and said supply passage and allow fluid communication between said outlet passage and said supply passage; and force balancing means for balancing fluid pressure forces tending to move said movable valve member in opposite directions resulting from supply fluid pressure acting on said movable valve member causing said movable valve member to be fluid force balanced while both in said first position and in said second position, wherein fluid forces tending to move said movable valve member in one direction resulting from supply fluid pressure acting on said movable valve member between said movable valve member and said floating pin are substantially balanced by fluid forces tending to move the valve member in an opposite direction resulting from supply fluid pressure acting on said movable valve member between said movable valve member and said valve housing intermediate said first and said second ends of said movable valve member when said movable valve member is in said second position.

44. A pressure balanced three-way valve assembly, comprising:

a valve housing containing a valve chamber, and a supply passage, an outlet passage and a drain passage, each communicating with said valve chamber;

a movable valve member mounted for reciprocal movement within said valve chamber between first and second positions, said movable valve member containing a cavity opening into at least one end of said movable valve member;

a recess formed in said valve housing radially between said movable valve member and said valve housing;

a stop means for defining one of said first and second positions of said movable valve member, said stop means including a floating pin arranged to be telescopingly received within said cavity of said movable valve member;

a first valve seat associated with said movable valve member, said first valve seat being positioned to be closed when said movable valve member is in said first position to seal said supply passage from the said outlet passage and said drain passage and allow fluid communication between said outlet passage and drain passage through said valve chamber;

a second valve seat associated with said movable valve member, said second valve seat being positioned to be closed when said movable valve member is in said second position to seal said drain passage from said outlet passage and said supply passage and allow fluid communication between said outlet passage and said supply passage;

force balancing means for balancing fluid pressure forces tending to move said movable valve member in opposite directions resulting from supply fluid pressure acting on said movable valve member causing said movable valve member to be fluid force balanced while both in said first position and in said second position, wherein fluid forces tending to move said movable valve member in one direction resulting from supply fluid pressure acting on said movable valve member between said movable valve member and said floating pin are substantially balanced by fluid forces tending to move said movable valve member in an opposite direction resulting from supply fluid pressure acting on said movable valve member in said recess between said movable valve member and said valve housing when said movable valve member is in said second position.

45. A pressure balanced three-way valve assembly, comprising
 a. a valve housing containing a valve chamber and first, second and third valve passages communicating with said valve chamber;
 b. a movable valve member mounted for reciprocal movement within said valve chamber between
  i. a first position in which said third valve passage is isolated from said first and second valve passages and said first and second valve passages are in fluid communication, and
  ii. a second position in which said second valve passage is isolated from said first and third valve passages and said first and third passages are in fluid communication,
 said movable valve member containing a cavity opening into one end of said movable valve member;
 c. a floating pin telescopingly received within said cavity of said movable valve member;
 d. a first valve seat located within said valve chamber and positioned to be closed when said movable valve member is in said first position to isolate said third valve passage from said first and second valve passages and allow fluid communication between said first and second valve passages;
 e. a second valve seat located within said cavity of said movable valve member, said second valve seat being positioned to be closed by said floating pin when said movable valve member is in said second position to seal said second passage from said first and third valve passages and allow fluid communication between said first and third valve passages;
 f. biasing means for causing said floating pin to follow said movable valve member to keep said second valve seat closed as said movable valve member is advanced toward said first position from said second position; and
 g. advancement stop means for preventing said floating pin from following said movable valve member all of the way to said first position to insure thereby that said second valve seat is opened before said movable valve member reaches said first position, wherein said floating pin includes a radial flange and said advancement stop means includes a shim positioned to engage said radial flange during advancement of said movable valve member, said shim being adapted for removal and replacement with another shim having a different axial length to vary the point during advancement of said movable valve member that further advancement of said floating pin is arrested to open said second valve seat.

* * * * *